US009640830B2

(12) United States Patent
Kawase et al.

(10) Patent No.: US 9,640,830 B2
(45) Date of Patent: May 2, 2017

(54) CURRENT COLLECTOR, NEGATIVE ELECTRODE AND BATTERY

(71) Applicant: Sony Corporation, Tokyo (JP)

(72) Inventors: Kenichi Kawase, Fukushima (JP); Isamu Konishiike, Fukushima (JP); Tomoo Takada, Fukushima (JP); Masayuki Iwama, Fukushima (JP); Nozomu Morita, Fukushima (JP); Yoshikazu Kato, Fukushima (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/064,820

(22) Filed: Mar. 9, 2016

(65) Prior Publication Data

US 2016/0190633 A1 Jun. 30, 2016

Related U.S. Application Data

(63) Continuation of application No. 11/687,848, filed on Mar. 19, 2007.

(30) Foreign Application Priority Data

Mar. 30, 2006 (JP) ................................ 2006-095608

(51) Int. Cl.
*H01M 2/00* (2006.01)
*H01M 10/04* (2006.01)
(Continued)

(52) U.S. Cl.
CPC ....... *H01M 10/0431* (2013.01); *H01M 4/134* (2013.01); *H01M 4/38* (2013.01); *H01M 4/382* (2013.01); *H01M 4/386* (2013.01); *H01M 4/387* (2013.01); *H01M 4/485* (2013.01); *H01M 4/505* (2013.01); *H01M 4/525* (2013.01); *H01M 4/583* (2013.01); *H01M 4/661* (2013.01); *H01M 4/70* (2013.01); *H01M 4/745* (2013.01); *H01M 10/0525* (2013.01); *H01M 10/0568* (2013.01); *H01M 10/0569* (2013.01); *H01M 10/0583* (2013.01); *H01M 10/0587* (2013.01); *H01M 4/587* (2013.01); *H01M 2004/027* (2013.01);
(Continued)

(58) Field of Classification Search
CPC ...................................................... H01M 2/00
See application file for complete search history.

(56) References Cited

U.S. PATENT DOCUMENTS

| 6,887,623 B2* | 5/2005 | Fujimoto | ............... H01M 4/13 429/232 |
| 2005/0095503 A1* | 5/2005 | Adachi | ............... H01M 10/052 429/188 |

FOREIGN PATENT DOCUMENTS

| JP | 1995-192767 | 7/1995 |
| JP | 09-306504 | * 11/1997 |

(Continued)

OTHER PUBLICATIONS

Chinese Examination Report issued in connection with related Chinese Patent Application No. 2006-095608 issued Aug. 8, 2008.
(Continued)

*Primary Examiner* — Jacob Marks
(74) *Attorney, Agent, or Firm* — Dentons US LLP

(57) ABSTRACT

A current collector including a first principal plane and a second principal plane. In the current collector, the roughness of the first principal plane and second principal plane being mutually different.

11 Claims, 3 Drawing Sheets

(51) Int. Cl.

| | | |
|---|---|---|
| *H01M 4/134* | (2010.01) | |
| *H01M 4/38* | (2006.01) | |
| *H01M 4/66* | (2006.01) | |
| *H01M 4/70* | (2006.01) | |
| *H01M 4/74* | (2006.01) | |
| *H01M 10/0583* | (2010.01) | |
| *H01M 10/0587* | (2010.01) | |
| *H01M 4/485* | (2010.01) | |
| *H01M 4/505* | (2010.01) | |
| *H01M 4/525* | (2010.01) | |
| *H01M 4/583* | (2010.01) | |
| *H01M 10/0525* | (2010.01) | |
| *H01M 10/0568* | (2010.01) | |
| *H01M 10/0569* | (2010.01) | |
| *H01M 4/587* | (2010.01) | |
| *H01M 4/02* | (2006.01) | |

(52) U.S. Cl.
 CPC ............... *H01M 2220/30* (2013.01); *H01M 2300/0028* (2013.01); *Y02E 60/122* (2013.01)

(56) References Cited

FOREIGN PATENT DOCUMENTS

| | | |
|---|---|---|
| JP | 1997-306504 | 11/1997 |
| JP | 1999-144762 | 5/1999 |
| JP | HEI 11-144762 | 5/1999 |
| JP | 2002-003727 | 1/2000 |
| JP | 2002-117850 | 4/2002 |
| JP | 2003-007305 | 1/2003 |
| JP | 2003-059493 * | 2/2003 |
| JP | 2004-095474 | 3/2004 |
| JP | 2005-085632 | 3/2005 |
| JP | 2005-340132 | 8/2005 |
| JP | 2005-293960 | 10/2005 |
| JP | 3733071 | 10/2005 |
| JP | 2006-059800 | 3/2006 |
| WO | WO/00/15875 | 3/2000 |
| WO | WO/2004/114437 | 12/2004 |

OTHER PUBLICATIONS

Korean Office Examination Report issued in connection with Korean Patent Application No. 10-2007-31647 dated Aug. 22, 2013.

Japanese Office Examination Report issued in connection with Japanese Patent Application No. JP 2006-095608 dated Oct. 8, 2010.

Japanese Office Examination Report issued in connection with Japanese Patent Application No. JP 2006-095608 dated Jun. 21, 2011.

Japanese Office Examination Report issued in connection with related Japanese Patent Application No. JP 2006-095608 dated Mar. 21, 2012.

* cited by examiner

CURRENT COLLECTOR, NEGATIVE ELECTRODE AND BATTERY

CROSS REFERENCE TO RELATED APPLICATIONS

This application is a continuation of U.S. patent application Ser. No. 11/687,848 filed Mar. 19, 2007, the entirety of which is incorporated herein by reference to the extent permitted by law. The present invention contains subject matter related to Japanese Patent Application JP 2006-095608 filed in the Japanese Patent Office on Mar. 20, 2006, the entire contents of which being incorporated herein by reference.

BACKGROUND OF THE INVENTION

Field of the Invention

The present invention relates to a battery including a positive electrode, a negative electrode, an electrolyte, and a negative electrode current collector, at least part of which is formed as a rough surface, and also relates to a current collector and a negative electrode forming the battery.

Description of the Related Art

With progress in science and technology such as semiconductor technology, personal computers (PCs), mobile phones, and the like have been developed, and batteries utilized as power supply for electronic apparatus have been expected to facilitate handling of the batteries such as reduction in size and weight, and to exhibit excellent electric properties.

In view of such expectations, the following types of lithium-ion secondary batteries have been developed and have widely been used: a lithium-ion secondary battery having a graphite material that uses an intercalation reaction of lithium (Li) between graphite layers, or a lithium-ion secondary battery utilizing a carbonaceous material as a negative electrode active material to which lithium insertion and extraction into pores are applied.

In recent years, as increasing in power and time consumed for the electronic apparatus due to higher performance of the electronic apparatus, an increase in capacity and power generation of a secondary battery have been desired, and especially in capacity, property improvement has much been desired.

A battery including a negative electrode active material layer formed of a carbon material such as graphite may be difficult to greatly improve properties because a battery capacity of the negative electrode active material is about to reach the theoretical limit.

Increasing a thickness of an active material layer may improve battery capacity; however, if such thick electrode is formed of a smooth current collector typically used in the related art, peeling (detaching} strength decreases to deteriorate cycle characteristics of the battery. Further, if an amount of a binder is increased so as to control to lower peeling strength, load characteristic of the battery is lowered, thereby adversely affecting the cycle characteristics of the battery.

Japanese Unexamined Patent Publication No. 2003-7305 and Japanese Unexamined Patent Publication No. 2004-95474 disclose a method of fabricating a battery using a thin plate-form current collector that includes rough surfaces of both principal planes to control to lower peeling strength. Such a current collector having rough surfaces may improve peel strength without extremely increasing amount of the binder as described above. However, if such a current collector includes rough surfaces for lowering peeling strength, the current collector may become susceptible to crack or fracture.

While, a negative electrode active material containing silicon (Si), tin (Sn), metal lithium (Li), and the like has been examined. Since such a negative electrode active material can be inserted much lithium (Li) as compared a case with a carbon material, capacity of the battery may greatly be increased.

However, since the negative electrode active material containing silicon (Si) and tin (Sn) drastically changes its volume when charging and discharging the battery, the inner pressure increases to impose loads upon members located around the negative electrode active material. Further, in an electrode having an alloyed interface between a current collector and an active material layer, both the current collector and the active material layer may be cracked or fractured, resulting in lowering the battery capacity.

SUMMARY OF THE INVENTION

In view of the aforementioned aspects, according to an embodiment of the present invention, there are provided a battery including a negative electrode formed of a current collector, part of which includes rough surface, and in which occurrence of crack or fracture are controlled, a current collector and a negative electrode that may form the battery.

According to an embodiment of the present invention, there is provided a current collector including a first principal plane and a second principal plane, with roughness of the first principal plane and the second principal plane being mutually different.

According to an embodiment of the present invention, there is also provided a negative electrode, including a current collector having a first principal plane and a second principal plane, with roughness of the first principal plane and the second principal plane being mutually different.

Further, according to an embodiment of the present invention, there is provided a battery having a positive electrode, a negative electrode, and an electrolyte that includes a current collector having a first principal plane and a second principal plane, with roughness of the first principal plane and the second principal plane being mutually different.

According to an embodiment of the present invention, in the battery formed of the current collector and the negative electrode, occurrence of crack or fracture on the negative electrode may be controlled, and especially if the negative electrode active material layer is formed of the negative electrode active material that drastically changes its volume when charging and discharging the battery, durability against volume change may also be improved.

According to an embodiment of the present invention, since a current collector includes a first principal plane and a second principal plane having mutually different roughness between the first principal plane and the second principal plane, occurrence of crack or fracture on the electrode may be controlled.

Further, according to an embodiment of the present invention, since a negative electrode formed of a current collector includes a first principal plane and a second principal plane having mutually different roughness between the first principal plane and the second principal plane, occurrence of crack or fracture on the electrode may be controlled.

According to an embodiment of the present invention, since a battery includes a first principal plane and a second principal plane of the negative current collectors having mutually different roughness between the first principal plane and the second principal plane, higher capacity of the battery may be obtained by forming the battery using the negative electrode active material that drastically changes its volume while controlling occurrence of crack or fracture on the electrode.

DESCRIPTION OF THE PREFERRED EMBODIMENTS

Embodiments of the present invention will be described below with reference to the drawings.

It should be noted that the following description includes a current collector and a negative electrode according to an embodiment of the present invention form a battery according to an embodiment of the present invention. However, the current collector and the negative electrode according to an embodiment of the present invention are not limited thereto, and the current collector and the negative electrode according to an embodiment of the present invention may not form a battery.

For example, the current collector and the negative electrode according to an embodiment of the present invention may form independent parts.

First Embodiment

A current collector, a negative electrode, and a battery according to first embodiment of the present invention will be described below.

Figure 1A:
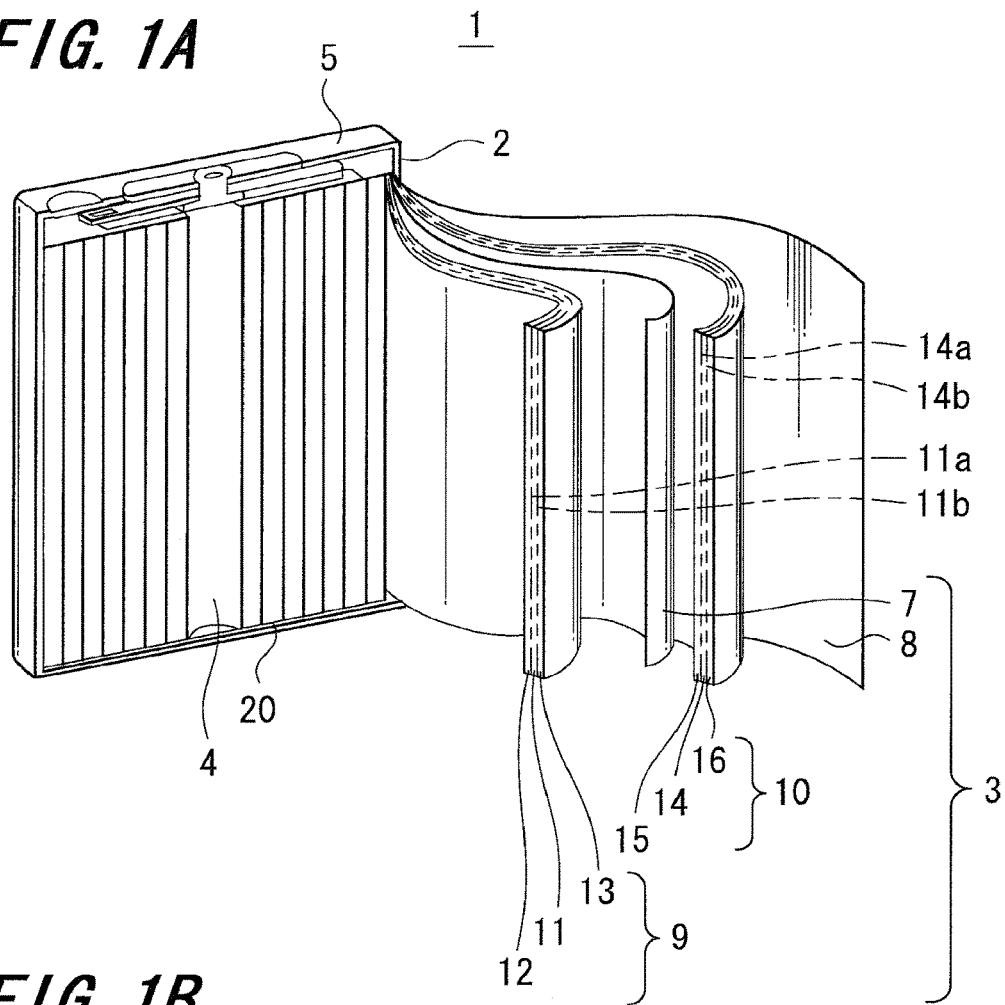
FIGS. 1A and 1B respectively show a partially sectioned schematic perspective view and a cross-sectional schematic view illustrating a battery of one embodiment according to an embodiment of the present invention.

An element winding type rectangular battery will be described as shown in FIG. 1A illustrating a partially sectioned schematic perspective view according to an embodiment of the present invention.

As shown in FIG. 1A, a battery 1 according to the embodiment of the present invention includes an electrode winding body 3 located around a center 4 inside a prismatic battery can 2, an upper surface of which is opened and enclosed with a battery lid 5.

The battery can 2 is formed of a nickel-plated iron, and the electrode winding body 3 includes mutually faced wound positive and negative electrodes 9 and 10 through a pair of wound separators 7 and 8 containing electrolytes.

The battery lid 5 is attached to the battery can 2 by caulking through gaskets and the like. Specifically, the inside of the battery can 1 is air-tightly enclosed with the battery can 2 and the battery 5.

Figure 1B:
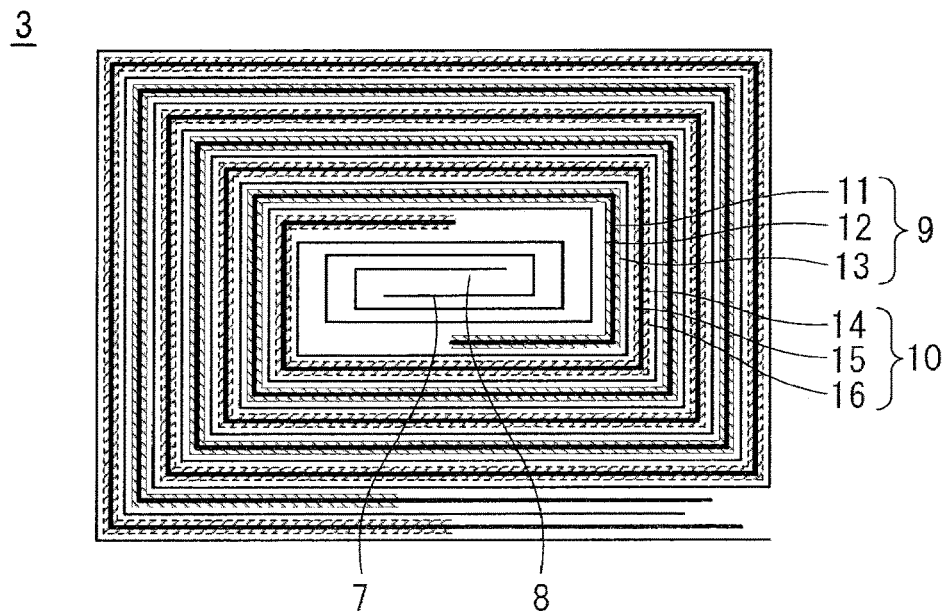

FIG. 1B schematically shows a cross-sectional structure of a winding surface of the winding body according to an embodiment of the present invention.

The electrode winding body 3 according to the embodiment of the present invention includes strip-shaped (thin plate-shaped) positive and negative electrodes 9 and 10 that are mutually faced through separators 7 and 8 containing electrolytes.

It should be noted that, although FIG. 1B schematically shows that the electrode winding body 3 forming a rectangular winding, the electrode winding body 3 has a cross-sectional shape having a curved portion (non-bent curved portion) such as an elliptic form inside the long and narrow battery can 2.

A positive electrode lead wire (not shown) formed of aluminum (Al) and the like, and a negative electrode lead wire (not shown) made of nickel (Ni) and the like are respectively connected to the positive and negative electrodes 9 and 10 of the electrode winding body 3. The positive lead wire is welded to a safety valve mechanism 6 to electrically connect to the battery lid 5. The negative electrode lead wire is directly For example, in the positive electrode 9 including a positive electrode current collector 11 with a first principal plane 11a corresponding to the inner surface and a second principal plane corresponding to the outer surface of the winding structure, an internal positive electrode active material layer 12 is formed on the side of the first principal plane 11a and an external positive electrode active material layer 13 is formed on the side of the second principal plane 11b, respectively.

Both the internal positive electrode active material layer 12 and the external positive electrode active material layer 13 may not necessarily be included. It is preferable that the internal positive electrode active material layer 12 and the external positive electrode active material layer 13 be selectively provided according to a desired configuration or desired properties of an objective battery. The positive electrode current collector 11 may be formed of aluminum, nickel, stainless steel, or the like.

The internal positive electrode active material layer 12 and the external positive electrode active material layer 13 contain any one of or two or more of positive electrode materials that can insert and extract lithium ions as a positive electrode active material and may optionally contain a conductive material such as a carbon material and a binder such as poly(vinylidene fluoride). As examples of the lithium transition metal composite oxide, a compound shown by a general formula LixMO2 may preferably given. Since a lithium-containing metal composite oxide may generate a high voltage and a high energy density; higher capacity for the secondary battery may be realized. For example, M preferably represents at least one type of transition metal elements selected from the group consisting of cobalt, nickel, and manganese (Mn). The subscript x represents the value that may vary with charging and discharging state of the battery and may fall in the range of $0.5 \leq x \leq 1.10$. The specific examples of lithium transition metal composite oxide may include $LiCoO_2$ or $LiNiO_2$. Notice that the positive electrode active material may be used alone or a combination of two or more.

For example, in the negative electrode 10 including a negative electrode current collector 14 with an first principal plane 14a corresponding to the inner surface and a second principal plane corresponding to the outer surface of the winding structure, an internal negative electrode active material layer 15 is formed on the side of the first principal plane 14a and an external negative electrode active material layer 16 is formed on the side of the second principal plane 14b, respectively.

Both the internal negative electrode active material layer 15 and the external negative electrode active material layer 16 may not necessarily be included. It is preferable that the internal negative electrode active material layer 15 and the external negative electrode active material layer 16 be selectively provided according to a desired thickness or desired materials suitable for surface roughness of the negative current collector 14 as will be described later.

It should be noted that the negative electrode current collector 14 and the negative electrode 10 are used as the first embodiment of the current collector and the negative electrode.

The negative electrode current collector 14 may be preferably formed of copper (Cu), stainless steel, nickel (Ni), titanium (Ti), tungsten (W), molybdenum (Mo) or aluminum (Al). Of these, the metal elements that may easily be alloyed with the inner surface and outer surface negative electrode active material layers 15 and 16 are preferable. For example, when the inner and outer surface negative electrode active material layers 15 and 16 contain at least one type of the individual elements or compounds selected from the group consisting of silicon (Si) and tin (Sn), copper (Cu), titanium (Ti), aluminum (Al) or nickel (Ni) may be given as materials that can easily be alloyed. It should be noted that the negative electrode current collector 14 may include a single layer or a plurality of layers. In that case, layers that contact with the inner and outer surface negative electrode active material layers 15 and 16 may be formed of metal materials that can easily be alloyed with the inner surface and outer surface negative electrode active material layers 15 and 16 and other layers may be formed of other metal materials.

In the battery 1 according to an embodiment of the present invention, if roughness (Ra value) of the first and second principal planes 14$a$ and 14$b$ of the negative electrode current collector 14 forming the negative electrode 10 are mutually different, a battery, though having the current collector 14 at least part of which includes rough surface, may include the negative electrode 10 that are not susceptible to crack or fracture, even when forming a thicker active material layer. Here, the Ra value represents parameters of surface roughness according to the JIS (Japanese Industrial Standard) standard and implies an arithmetic mean surface roughness.

If the negative electrode current collector 14 differentiates in the surface roughness between the first and second principal planes 14$a$ and 14$b$, occurrence of crack or fracture on the electrode may be controlled when the negative electrode active material layer is formed on both surfaces of the inner surface and outer surface negative electrode active material layers 15 and 16, or when the negative electrode active material layer is formed only on one surface. However, when the negative electrode active material layer is formed only on one surface, a higher-performance battery may particularly be obtained. It should be noted that if the active material layer is formed only on one principal plane of the negative electrode current collector 14, and only the surface where the active material layer is formed includes rough surface, excellent characteristics may be obtained; and when the active material layer is formed on both principal planes, and both of the principal planes include rough surfaces having different degrees of roughness, excellent characteristics may particularly be obtained.

In the surface roughness of the current collector, the roughness Ra of the principal plane having higher roughness may preferably be equal to or greater than 0.2 µm. Accordingly, adhesion may be increased. However, when an extreme roughing treatment is applied, if roughness of both surfaces of the negative electrode current collector 14 is decreased to include mutually different degrees of roughness, the negative electrode current collector 14 is susceptible to crack or fracture. Therefore, the value Ra of the principal plane having higher roughness may preferably be equal to or less than 3.0 µm.

It should be noted that the optimum value of the roughness Ra and the range thereof are affected by the thickness of the current collector. For example, if a current collector having a thickness of about 5 to 20 µm available at present is unused but instead a thicker current collector is used, drastic roughness may be suppressed to result in less crack or fracture. Therefore, it is preferable that the optimum value of the roughness Ra and the range thereof be carefully selected based on the relationship. However, a battery having an extremely thick current collector may not increase capacity of the battery due to an increase in the volume of the current collector portion. Therefore, in the battery 1 according to the embodiment of the present invention, as the current collector with which cycle characteristics can be maintained and crack or fracture can be prevented, the current collector having a thickness of about 5 to 30 µm and having the above described range of the Ra value (roughness) may be preferable.

Further, it is preferable that difference in roughness between both surfaces of the first and second principal planes 14$a$ and 14$b$ may be equal to or greater than 0.05 µm base on the Ra value. In contrast, although one principal plane includes a desired value in roughness, if roughness of the other surface may have approximately the same roughness of one principal plane, improvements of characteristics will be limited to certain degrees as will be described later.

Further, as will be described later, the battery according to an embodiment of the present invention can achieve an excellent effect particularly when both of the positive electrode 9 and the negative electrode 10 includes the active material layers that have a thickness greater than 70 µm for the thickness of either one of the current collectors. The electrode having such a thick active material layer may exhibit a decrease in peel strength and may apply large stress to an interface that does not support an entire surface of the current collector.

Accordingly, the electrode becomes susceptible to crack or fracture when charging and discharging the battery. It should be noted that the thickness of the active material layer may be defined as one obtained at full discharge where the remaining battery capacity in the apparatus using the battery reaches zero. That is, this case is different from a case where a battery voltage is set to zero by attaching a fixed resistor to a power supply terminal.

In the battery according to an embodiment of the present invention, if roughness of the first and second principal planes 14$a$ and 14$b$ of the negative electrode current collector 14 are mutually different, crack or fracture of the electrode, though including a particularly thick active material layer, may be lowered or prevented while maintaining adhesion to the interface.

The internal and external negative electrode active material layers 15 and 16 may contain at least one kind of individual elements or compounds selected from the group consisting of metal elements or semimetal elements which can be alloyed with lithium (Li) as a negative electrode active material due to obtaining high energy density.

Examples of such metal elements or semimetal elements include palladium (Pd), platinum (Pt), zinc (Zn), cadmium (Cd), mercury (Hg), aluminum (Al), indium (In), silicon (Si), germanium (Ge), tin (Sn), lead (Pb), arsenic (As), antimony (Sb) or bismuth (Bi). As examples of these compounds, compounds shown by the chemical formula Ma$s$, Mbt may be given. In the chemical formula, Ma represents at least one kind of metal elements and semimetal elements which can be alloyed with lithium (Li) and Mb represents at least one kind of elements other than Ma. The value s indicates s>0 and the value t indicates t≥0, respectively.

Of these metal elements and semimetal elements, individual elements such as silicon (Si), germanium (Ge), tin (Sn) or lead (Pb), or compounds including the individual elements may be preferable, with individual elements of the silicon (Si) or tin (Sn), or compounds formed of the individual elements of the silicon (Si) or tin (Sn). Thus, the individual element and the compound of silicon (Si) or tin (Sn) have large ability to insert and extract lithium (Li), and may increase energy density of the negative electrode 10 depending on a combination thereof. It should be noted that the compound of silicon (Si) and tin (Sn) may be crystal or amorphous; however, amorphous or an aggregate of microcrystallite may be preferable. The amorphous or microcrystallite may include a broad pattern that has half the width of a peak in a diffraction pattern obtained by X-ray diffraction analysis using CuKα as characteristic X-rays is 0.5° or more at 2θ and ranges of from 30° to 60° at 2θ.

Examples of the compound of silicon (Si) and tin (Sn), include $SiB_4$, $SiB_6$, $Mg_2Si$, $Mg_2Sn$, $Ni_2Si$, $TiSi_2$, $MoSi_2$, $CoSi_2$, NiSi2, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N2O$, $SiOv$ (0<v≤2), $SnOw$ (0<w≤2), $SnSiO_3$, LiSiO or LiSnO.

Some of high capacity active materials that can form the first and second negative electrode active material layer 15 and 16 of the negative electrode 10 may drastically change the volume when the battery is charged and discharged as described earlier. In particular, if the high capacity active material contains silicon (Si) or tin (Sn), when the active material layer is thin, the volume may change drastically to peel off the layer from the interface of the current collector and to apply stress to the entire inside of the battery when the battery is charged and discharged, thereby further causing the electrode to be either cracked or fractured. In the battery according to the embodiment of the present invention, when the individual element or compound of silicon (Si) or tin (Sn) is used as the negative electrode active material to obtain high energy density, since the negative electrode can control crack or fracture, thereby forming a large capacity battery without the above-mentioned issues.

The first and second negative electrode active material layers 15 and 16 may be preferably formed by at least one method selected from the group consisting of a vapor-phase method, a liquid-phase method and a sintering method. Specifically, the battery may be prevented from being destroyed as the internal and external negative electrode active material layers 15 and 16 are expanded and contracted when the battery is charged and discharged and the negative electrode current collector 14 and the first and second negative electrode active material layers 15 and 16 can be integrated to improve electron conductivity in the internal and external negative electrode active material layers 15 and 16. The binder and gaps may be decreased or eliminated so that the negative electrode 30 may be reduced in thickness.

It should be noted that the baking method includes mixing powder containing active material and the binder to mold a layer, and the resultant layer is heat-treated in the non-oxidizing atmosphere to form a denser layer than the layer before the heat treatment.

The first and second negative electrode active material layers 15 and 16 may be preferably formed by at least one method selected from the group consisting of a vapor-phase method, a liquid-phase method and a sintering method. The internal and external negative electrode active material layers 15, 16 may preferably be alloyed with the negative electrode current collector 14 at least on a part of the interface between the internal and external negative electrode active material layers 15, 16 and the negative electrode current collector 14. Specifically, at the interface, elements of the negative electrode current collector 14 should preferably be diffused into the inner surface and outer surface negative electrode active material layers 15 and 16 or elements of the inner surface and outer surface negative electrode active material layers 15 and 16 should preferably be diffused into the negative electrode current collector 14 or those elements should preferably be diffused to each other. Although it is frequently observed that the alloying may take place simultaneously when the inner surface and outer surface negative electrode active material layers 15 and 16 are formed by the vapor-phase method, the liquid-phase method or the sintering method, the alloying may take place due to a further heat treatment. It should be noted that the above-mentioned diffusion of elements may be included in alloying in the application.

It should be noted that the first and second negative electrode active material layers 15 and 16 may be formed by coating, specifically, negative electrode active materials and powder may optionally be bonded with a binder such as vinylidene polyfluoride.

In this case, powder of silicon (Si) or tin (Sn) compound may preferably have a primary particle diameter selected in a range of from 0.1 μm to 35 μm and more preferably the above primary particle diameter may be selected in a range of from 0.1 μm to 25 μm. If the particle diameter is smaller than this range, an undesired reaction occurs remarkably between the particle surface and an electrolytic solution, thereby deteriorating capacity or efficiency of the electrodes. If, on the other hand, the particle diameter is larger than this range, a reaction between it and lithium (Li) may not proceed within the particle, thereby decreasing the capacity of the electrodes. It should be noted that as a particle size measuring method, an observation method based on an optical microscope or electron microscope or laser diffraction method may be given, and it is preferable that the above observation method or the above laser diffraction method may be selectively used in response to the particle size region. It is also preferable that classification may be carried out to obtain a desired particle size. A classification method is not particularly limited, and a sieve or a wind power classifier may be used in a dry method or a wet method.

It should be noted that powder of the individual element or compound of silicon (Si) or tin (Sn) can be manufactured by a related-art method used in a powder metallurgy and the like. Examples of the related-art method include a method in which a raw material is melted by a melting furnace such as an arc smelting furnace and a high-frequency induced heating furnace, cooled and ground, a method of quenching a melted metal of a raw material such as a single roll quenching method, a twin-roll quenching method, a gas atomizing method, a water atomizing method or a centrifugal atomizing method and a method in which a melted metal of a raw material is solidified by a cooling method such as a single roll quenching method and a twin-roll quenching method and ground by a suitable method such as a mechanical alloying method. In particular, it is preferable that the gas atomizing method or the mechanical alloying method may be used. It should be noted that these synthesis and grinding may preferably be carried out in the inert gas atmosphere such as argon (Ar) gas, nitrogen (N) gas or helium (H) gas or in vacuum atmosphere in order to prevent metals from being oxidized by oxygen (O) in the air.

The separators 7 and 8 may separate the positive electrode 9 and the negative electrode 10 from each other and they may pass lithium (Li) ions while preventing an electric current from being short-circuited when both electrodes 9 and 10 contact with each other, and they may be formed of a micro-porous polyolefin film such as a polyethylene film or a polypropylene film, for example. In order to maintain safety, it is preferable that the separators 7 and 8 may have a function to close the micro-pores by hot-melting at a temperature higher than a predetermined temperature (e.g., 120° C.), thereby increasing resistance so that an electric current may be interrupted. More than two separators mainly made of polyethylene and more than two separators with different compositions mainly made of polypropylene can be bonded.

The separators 7 and 8 are impregnated with an electrolytic solution (not shown). This electrolytic solution may contain a solvent and an electrolytic salt dissolved into this solvent, and may optionally contain various kinds of additives.

Examples of the solvents include propylene carbonate, ethylene carbonate, diethyl carbonate, methyl ethyl carbonate, 1, 2-dimethoxy ethane, 1, 2-diethoxy ethane, γ-butyrolactone, tetrahydrofuran, 2-methyl tetrahydrofuran, 1, 3-dioxolane, 4-methyl-1, 3-dioxolane, diethyl ether, sulfolane, methyl sulfolane, acetonitrile, propylnitrile, anisole, acetic ester or propionic acid ester. The additives may be used alone or a combination of tow or more.

Examples of the electrolytic salt include $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$, $LiN(C_4F_9SO_2)(CF_3SO_2)$, LiCl or LiBr. Of these electrolytic salts, $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$ or $LiN(C_4F_9SO_2)(CF_3SO_2)$ should be preferable. Of these electrolytic salts, $LiPF_6$ or $LiBF_4$ should be particularly preferable. Any one of the above electrolytic salts may be used as the above electrolytic salt or more than two kinds of electrolytic salts may be mixed and used as the above electrolytic salt.

Second Embodiment

A current collector, a negative electrode and a battery according to a second embodiment of the present invention will be described.

In this embodiment, a so-called element winding type cylindrical battery shown in a partly cutaway perspective view of FIG. 2A will be described.

Figure 2A:
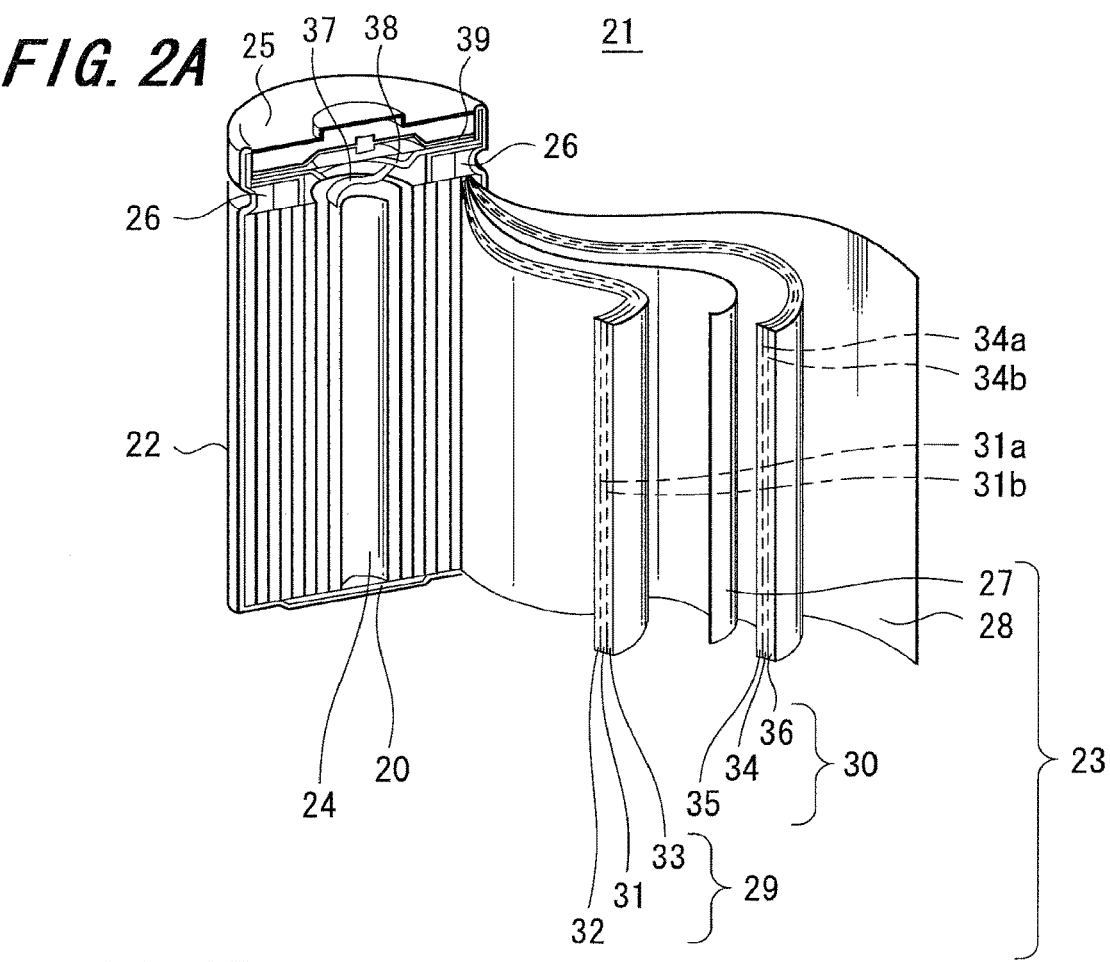
FIGS. 2A and 2B respectively show a partially sectioned schematic perspective view and a cross-sectional schematic view illustrating a battery of another embodiment according to an embodiment of the present invention.

As shown in FIG. 2A, a battery 21 according to the embodiment of the present invention includes a cylindrical battery can 22 with its upper surface opened in which a electrode winding body 23 is located at a center pin 24 (not shown) and which is sealed by a battery lid 25.

The battery can 22 is configured by a nickel-plated iron, and the electrode winding body 23 has an arrangement in which a positive electrode 29 and a negative electrode 30 similarly wound are located in an opposing fashion through a pair of wound separators 27 and 28 containing electrolyte.

The battery lid 25 includes a safety valve mechanism 38 together with a heat sensitive resistance element (positive temperature coefficient which will hereinafter be simply referred to as a "PTC element") 39 incorporated therein, and it is attached to the battery can 22 when caulked through gaskets (not shown) and the like. That is, the inside of the battery 21 is hermetically closed by the battery can 22 and the battery lid 25.

The safety valve mechanism 38 is electrically connected to the battery lid 25 through the PTC element 39. When an internal pressure of the battery 21 is increased to be higher than a constant value by inside short-circuiting or with application of heat from the outside, a built-in disk plate, for example, is caused to invert to disconnect electric connection between the battery lid 25 and the electrode winding body 23. The PTC element 39 may prevent abnormally-intensive heat from being generated due to a large electric current by limiting an electric current increased by the increase of resistance when a temperature rises.

Figure 2B:
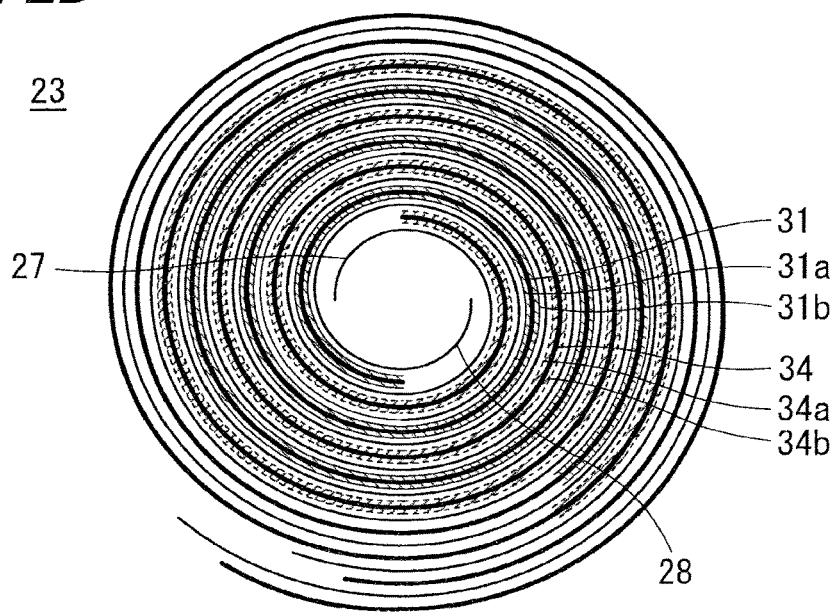

FIG. 2B schematically shows a cross-sectional structure of the winding surface of the electrode winding body 23 according to the embodiment of the present invention.

In this embodiment, the electrode winding body 23 has an arrangement in which the strip-like (thin plate-like) positive electrode and negative electrodes 29 and 30 are located in an opposing fashion through the separators 27 and 28 containing electrolyte, these positive and negative electrodes 29 and 30 being wound around the electrode winding body 23.

A positive lead wire made of aluminum (Al), for example, and a negative lead wire made of nickel (Ni) and the like (not shown) are respectively connected to the positive electrode 29 and the negative electrode 30 of the electrode winding body 23. A positive lead wire is welded to the safety valve mechanism 38 and thereby electrically connected to the battery lid 25, and the negative lead wire is directly welded to the battery can 22 and thereby electrically connected thereto.

Here, the positive electrode 29 includes a positive electrode current collector 31 including a first principal plane 31a used as an inner surface in the winding structure and a second principal plane 31b used as an outer surface wherein a first positive electrode active material layer 32 is formed on the side of the first principal plane 31a and a second positive electrode active material layer 33 is formed on the side of the second principal plane 31b.

Both of the first and second positive electrode active material layers 32 and 33 need not always be provided and they should preferably be selected and configured in response to target battery arrangement and characteristics. The positive electrode current collector 31 may be made of aluminum (Al), nickel (Ni) or stainless steel, for example.

Also, the first and second positive electrode active material layers 32 and 33 may contain a positive electrode active material and they may contain a conductivity assisting agent such as a carbonaceous material and a binder such as poly(vinylidene) fluoride if necessary. Lithium containing metal composite oxide expressed by a general formula $Li_xMO_2$, for example, should preferably be used as the positive electrode active material because the lithium containing metal composite oxide is able to generate a high voltage and it is high in density so that it can make the secondary battery become higher in capacity. It should be noted that M is more than one kind of transition metal and it should be at least one kind selected from a group consisting of cobalt (Co), nickel (Ni) and manganese (Mn). The x may differ depending on the battery charging and discharging states and it is a value generally selected in a range of $0.05 \leq x \leq 1.10$. $LiCoO_2$ or $LiNiO_2$ may be enumerated as specific examples of such lithium containing metal composite oxide. It should be noted that the positive electrode active material may use any one kind of lithium containing metal composite oxide and that it may mix more than two kinds of lithium containing metal composite oxides.

On the other hand, the negative electrode 30 includes a negative electrode current collector 34 having a first principal plane 34a used as an inner surface in the winding structure and a second principal plane 34b used as an outer surface and in which a first negative electrode active material layer 35 is formed on the side of the first principal plane 34a and a second negative electrode active material layer 36 is formed on the side of the second principal plane 34b, respectively.

It should be noted that both of the first and second negative electrode active material layers 35 and 36 need not always be provided as will be described later on. Thicknesses and materials thereof should preferably be selected in response to roughness of the surface of the negative electrode current collector 34 which will be described later on.

It should be noted that the negative electrode current collector 34 and the negative electrode 30 may be used as the current collector and the negative electrode according to the second embodiment of the present invention.

In the battery 31 according to an embodiment of the present invention, if roughness (Ra value) of the first and second principal planes 34a and 34b of the negative electrode current collector 34 forming the negative electrode 30 are mutually different, a battery, though having the current collector 34 at least part of which includes rough surface, may include the negative electrode 30 that are not susceptible to crack or fracture, even when forming a thicker active material layer.

Here, the Ra value represents parameters of surface roughness according to the JIS (Japanese Industrial Standard) standard and implies an arithmetic mean surface roughness.

If the negative electrode current collector 34 differentiates in the surface roughness between the first and second principal planes 34a and 34b, occurrence of crack or fracture on the electrode may be controlled when the negative electrode active material layer is formed on both surfaces of the inner surface and outer surface negative electrode active material layers 35 and 36, or when the negative electrode active material layer is formed only on one surface. However, when the negative electrode active material layer is formed only on one surface, a higher-performance battery may particularly be obtained. It should be noted that if the active material layer is formed only on one principal plane of the negative electrode current collector 34, and only the surface where the active material layer is formed includes rough surface, excellent characteristics may be obtained; and when the active material layer is formed on both principal planes, and both of the principal planes include rough surfaces having different degrees of roughness, excellent characteristics may particularly be obtained.

In the surface roughness of the current collector, the roughness Ra of the principal plane having higher roughness may preferably be equal to or greater than 0.2 µm. Accordingly, adhesion may be increased. However, when an extreme roughing treatment is applied, if roughness of both surfaces of the negative electrode current collector 14 is decreased to include mutually different degrees of roughness, the negative electrode current collector 14 is susceptible to crack or fracture. Therefore, the value Ra of the principal plane having higher roughness may preferably be equal to or less than 3.0 µm.

It should be noted that the optimum value of the roughness Ra and the range thereof are affected by the thickness of the current collector. For example, if a current collector having a thickness of about 5 to 20 µm available at present is unused but instead a thicker current collector is used, drastic roughness may be suppressed to result in less crack or fracture. Therefore, it is preferable that the optimum value of the roughness Ra and the range thereof be carefully selected based on the relationship. However, a battery having an extremely thick current collector may not increase capacity of the battery due to an increase in the volume of the current collector portion. Therefore, in the battery 21 according to the embodiment of the present invention, as the current collector with which cycle characteristics can be maintained and crack or fracture can be prevented, the current collector having a thickness of about 5 to 30 µm and having the above described range of the Ra value (roughness) may be preferable.

Further, it is preferable that difference in roughness between both surfaces of the first and second principal planes 34a and 34b may be equal to or greater than 0.05 µm base on the Ra value. In contrast, although one principal plane includes a desired value in roughness, if roughness of the other surface may have approximately the same roughness of one principal plane, improvements of characteristics will be limited to certain degrees as will be described later.

Further, as will be described later, the battery according to an embodiment of the present invention can achieve an excellent effect particularly when both of the positive electrode 29 and the negative electrode 30 includes the active material layers that have a thickness greater than 70 µm for the thickness of either one of the current collectors. The electrode having such a thick active material layer may exhibit a decrease in peel strength and may apply large stress to an interface that does not support an entire surface of the current collector.

Accordingly, the electrode becomes susceptible to crack or fracture when charging and discharging the battery. It should be noted that the thickness of the active material layer may be defined as one obtained at full discharge where the remaining battery capacity in the apparatus using the battery reaches zero. That is, this case is different from a case where a battery voltage is set to zero by attaching a fixed resistor to a power supply terminal.

In the battery according to an embodiment of the present invention, if roughness of the first and second principal planes 34a and 34b of the negative electrode current collector 34 are mutually different, crack or fracture of the electrode, though including a particularly thick active material layer, may be lowered or prevented while maintaining adhesion to the interface.

The negative electrode current collector 34 should be preferably made of copper (Cu), stainless steel, nickel (Ni), titanium (Ti), tungsten (W), molybdenum (Mo) or aluminum (Al). Of these metal elements, the negative electrode current collector 34 should preferably be made of metals which can easily be alloyed with the inner surface and outer surface negative electrode active material layers 35 and 36. For example, when the inner and outer surface negative electrode active material layers 35 and 36 contain at least one kind selected from a group consisting of individual elements or compounds of silicon (Si) and tin (Sn) as will be described later on, copper (Cu), titanium (Ti), aluminum (Al) or nickel (Ni) may be enumerated as materials that can be alloyed easily.

It should be noted that the negative electrode current collector 34 may be composed of either a single layer or a plurality of layers. In that case, layers that contact with the inner and outer surface negative electrode active material layers 35 and 36 may be made of metal materials that can be alloyed with the inner surface and outer surface negative electrode active material layers 35 and 36 and other layers may be made of other metal materials.

The inner surface and outer surface negative electrode active material layers 35 and 36 may contain at least one kind selected from a group consisting of individual elements and compounds of metal elements or semimetal elements which can be alloyed with lithium metal and lithium (Li) as a negative electrode active material because they can generate high energy density.

As such metal elements or semimetal elements, there can be enumerated palladium (Pd), platinum (Pt), zinc (Zn), cadmium (Cd), mercury (Hg), aluminum (Al), indium (In), silicon (Si), germanium (Ge), tin (Sn), lead (Pb), arsenic (As), antimony (Sb) or bismuth (Bi). Compounds expressed by a chemical formula $Ma_sMb_t$, for example, may be enumerated as these compounds mentioned above. In this chemical formula, Ma expresses at least one kind of metal elements and semimetal elements which can be alloyed with lithium (Li) and Mb expresses at least one kind of other elements than Ma. The values of s and t are given by inequalities of $s>0$ and $t\geq 0$, respectively.

Of these metal elements and semimetal elements, individual elements or compounds of silicon (Si), germanium (Ge), tin (Sn) or lead (Pb) should be preferable and particularly-preferable metal elements and semimetal elements are individual elements of the silicon (Si) or tin (Sn) or compounds thereof. The reason for this is that the individual element and the compound of silicon (Si) or tin (Sn) have large ability to insert and extract lithium (Li) and that they are able to increase energy density of the negative electrode 30 depending on a combination thereof. It should be noted that the compound of silicon (Si) and tin (Sn) may be either crystal or amorphous and that it should preferably be a polymer of amorphous or microcrystal. The amorphous or microcrystal may have a pattern in which a half width of a peak of a diffraction pattern obtained by X-ray diffraction analysis using CuKα as characteristic X-rays is higher than 0.5° at 2θ and it may also have a broad pattern in which a half width ranges of from 30° to 60° at 2θ.

As the compound of silicon (Si) and tin (Sn), there may be enumerated $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$), $SnO_w$ ($0<w\leq 2$), $SnSiO_3$, $LiSiO$ or $LiSnO$, for example.

Some of high capacity active materials that can construct the inner surface and outer surface negative electrode active material layer 35 and 36 of the negative electrode 30 may be caused to change its volume vehemently when the battery is charged and discharged as mentioned before. In particular, if the high capacity active material contains silicon (Si) or tin (Sn), then even when the active material layer is thin, its volume may change considerably to release the layer from the interface of the current collector and to apply stress to the whole of the inside of the battery when the battery is charged and discharged, which further causes the electrode to be either cracked or split. According to the arrangement of the battery according to the embodiment of the present invention, similarly to the first embodiment, when the individual element or compound of silicon (Si) or tin (Sn) is used as the negative electrode active material in order to obtain high energy density, since it is possible to suppress the negative electrode from being either cracked or split, it becomes possible to construct a large-capacity battery in which the problems can be avoided.

The inner surface and outer surface negative electrode active material layers 35 and 36 should be preferably formed by at least one method selected from a group consisting of a vapor-phase method, a liquid-phase method and a sintering method.

Specifically, the reason for this is that this arrangement can suppress the battery from being destroyed as the inner surface and outer surface negative electrode active material layers 35 and 36 are expanded and contracted when the battery is charged and discharged and that the negative electrode current collector 34 and the inner surface and outer surface negative electrode active material layers 35 and 36 can be integrated to improve electronic conductivity in the inner surface and outer surface negative electrode active material layers 35 and 36. Also, the binder and gaps can be decreased or removed so that the negative electrode 30 can be reduced in thickness.

The inner surface and outer surface negative electrode active material layers 35 and 36 should preferably be alloyed with the negative electrode current collector 34 at least on a part of the interface between them and the negative electrode current collector 34. Specifically, at the interface, constitutive elements of the negative electrode current collector 34 should preferably be diffused into the inner surface and outer surface negative electrode active material layers 35 and 36 or constitutive elements of the inner surface and outer surface negative electrode active material layers 35 and 36 should preferably be diffused into the negative electrode current collector 34 or those constitutive elements should preferably be diffused to each other. Although it is frequently observed that this alloying may take place simultaneously when the inner surface and outer surface negative electrode active material layers 35 and 36 are formed by the vapor-phase method, the liquid-phase method or the sintering method, the alloying may take place due to a further heat treatment. It should be noted that the above-mentioned diffusion of elements may be included in alloying in the application of the present invention.

It should be noted that the inner surface and outer surface negative electrode active material layers 35 and 36 may be formed by coating, to be concrete, negative electrode active materials and powders may be bonded by a binder such as polyvinyl alcohol, polyimide, polyamideimide and poly (vinylidene) fluoride, if necessary.

In this case, it is preferable that powder of silicon (Si) or tin (Sn) compound should preferably have a primary particle size selected in a range of from 0.1 μm to 35 μm and it is more preferable that the above primary particle size should be selected in a range of from 0.1 μm to 25 μm. If the particle size is smaller than this range, then an undesired reaction between the particle surface and an electrolytic solution, which will be described later on, becomes remarkable and there is then a risk that capacity or efficiency will be deteriorated. If on the other hand the particle size is larger than this range, then a reaction between it and lithium (Li) becomes difficult to proceed within the particle and there is then a risk that the capacity will be lowered. It should be noted that an observation method based on an optical microscope or electron microscope or laser diffraction method may be enumerated as a particle size measuring method and it is preferable that the above observation method or the above laser diffraction method should be selectively used in response to the particle size region. Also, it is preferable that classification should be carried out in order to obtain a desired particle size. A classification method is not limited in particular, and a sieve or a wind power classifier can be used in a dry method or a wet method.

It should be noted that powder of the individual element or compound of silicon (Si) or tin (Sn) can be manufactured by a related-art method used in a powder metallurgy and the like. As the related-art method, there may be enumerated a method in which a raw material is melted by a melting furnace such as an arc remelting furnace and a high-frequency induced heating furnace, cooled and ground, a method of quenching a melted metal of a raw material such as a single roll quenching method, a twin-roll quenching method, a gas atomizing method, a water atomizing method or a centrifugal atomizing method and a method in which a melted metal of a raw material is solidified by a cooling method such as a single roll quenching method and a twin-roll quenching method and ground by a suitable method such as a mechanical alloying method. In particular, it is preferable that the gas atomizing method or the mechanical alloying method should be used. It should be noted that these synthesis and grinding should preferably be carried out in the inert gas atmosphere such as argon (Ar) gas, nitrogen (N) gas or helium (H) gas or in the vacuum atmosphere in order to prevent metals from being oxidized by oxygen (O) in the air.

The separators 27 and 28 may separate the positive electrode 29 and the negative electrode 30 from each other and they may pass lithium (Li) ions while preventing an electric current from being short-circuited when both electrodes 29 and 30 contact with each other, and they may be formed of a micro-porous polyolefin film such as a polyethylene film or a polypropylene film, for example. In order to maintain safety, it is preferable that the separators 27 and 28 may have a function to close the micro-pores by hot-melting at a temperature higher than a predetermined temperature (e.g., 120° C.), thereby to increase resistance so that an electric current may be interrupted. More than two separators mainly made of polyethylene and more than two separators with different compositions mainly made of polypropylene can be bonded.

In this embodiment of the present invention, the separators 27 and 28 are impregnated with an electrolytic solution (not shown). This electrolytic solution may contain a solvent and an electrolytic salt dissolved into this solvent, and they may contain various kinds of additives, if necessary.

As the solvents, there may be enumerated propylene carbonate, ethylene carbonate, diethyl carbonate, methyl ethyl carbonate, 1, 2-dimethoxy ethane, 1, 2-diethoxy ethane, γ-butyrolactone, tetrahydrofuran, 2-methyl tetrahydrofuran, 1, 3-dioxolane, 4-methyl-1, 3-dioxolane, diethyl ether, sulfolane, methyl sulfolane, acetonitrile, propylnitrile, anisole, acetic ester or propionic acid ester. Any one of the above-mentioned additives may be used as the above solvent or more than two kinds of the above-mentioned additives may be mixed and used as the above solvent.

As the electrolytic salt, there may be enumerated $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$, $LiN(C_4F_9SO_2)(CF_3SO_2)$, LiCl or LiBr. Of these electrolytic salts, $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$ or $LiN(C_4F_9SO_2)(CF_3SO_2)$ should be preferable. Of these electrolytic salts, $LiPF_6$ or $LiBF_4$ should be particularly preferable. Any one of the above electrolytic salts may be used as the above electrolytic salt or more than two kinds of electrolytic salts may be mixed and used as the above electrolytic salt.

Third Embodiment

A current collector, a negative electrode and a battery according to a third embodiment of the present invention will be described.

In this embodiment of the present invention, a battery of a type different from that of the first embodiment will be described with reference to an example of a so-called element bending system (stack system) rectangular battery shown in a partly cutaway perspective view of FIG. 3A.

A battery 41 according to the embodiment of the present invention has an arrangement in which a bending body 43a is located within a prismatic battery can 42 of which upper surface is opened and the battery can 42 is sealed by a battery lid 55.

The battery can 42 is made of a nickel-plated iron, for example, and the bending body 43a has an arrangement in which positive and negative electrodes 29 and 30 bent in a like manner are located in an opposing fashion through a pair of separators 47 and 48 bent containing an electrolyte. It should be noted that the battery can 42 can be made of aluminum (Al), stainless steel and the like.

The battery lid 55 is attached to the battery can 42 by caulking through gaskets and the like. That is, the inside of the battery 41 is hermetically closed by the battery can 42 and the battery lid 55.

In this embodiment of the present invention, the bending bond 43a has an arrangement in which strip-like (thin plate-like) positive and negative electrodes 49 and 50 are located in an opposing fashion through separators 47 and 48 containing the electrolyte and these elements 49, 50 and 47, 48 are bent, respectively.

Figure 3A:
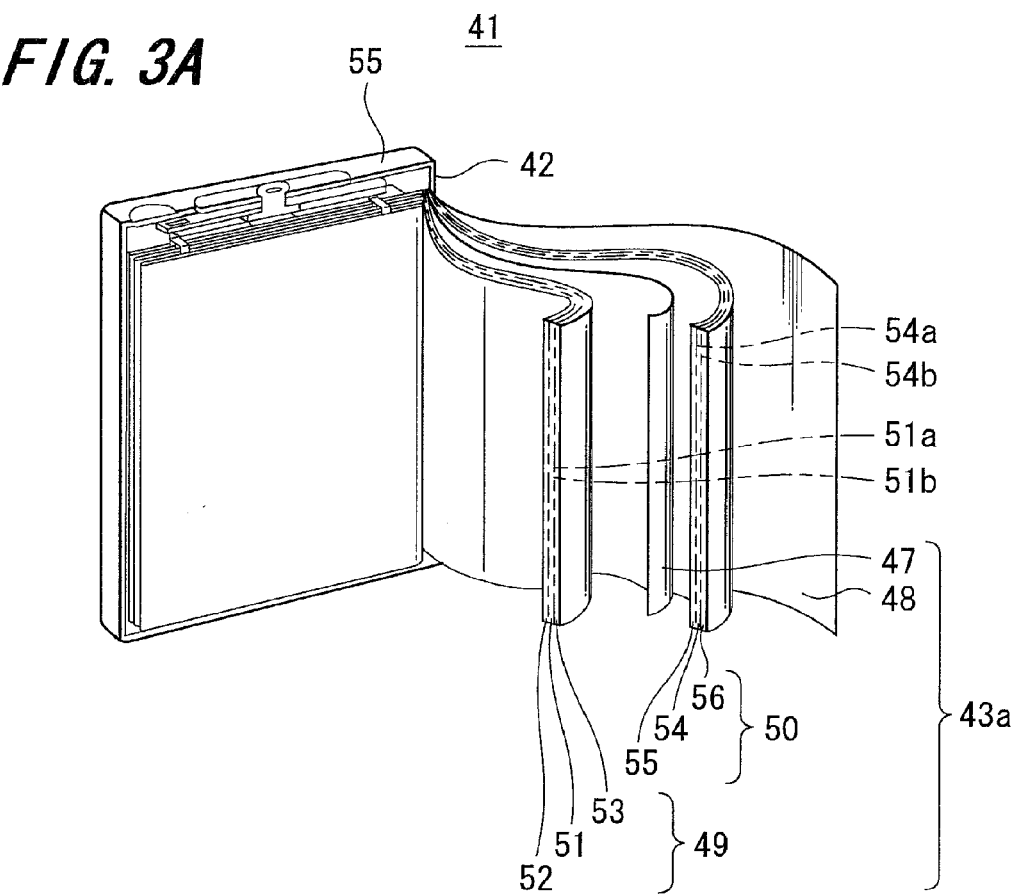
FIGS. 3A to 3C respectively show a partially sectioned schematic perspective view illustrating a battery of still another embodiment and a schematic view illustrating bending bodies in a first and second embodiments according to an embodiment of the present invention.
Figure 3B:
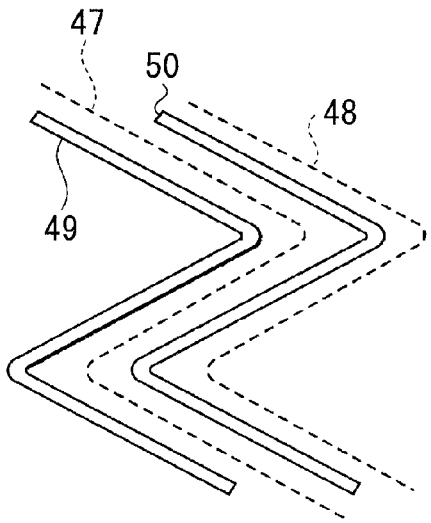
Figure 3C:
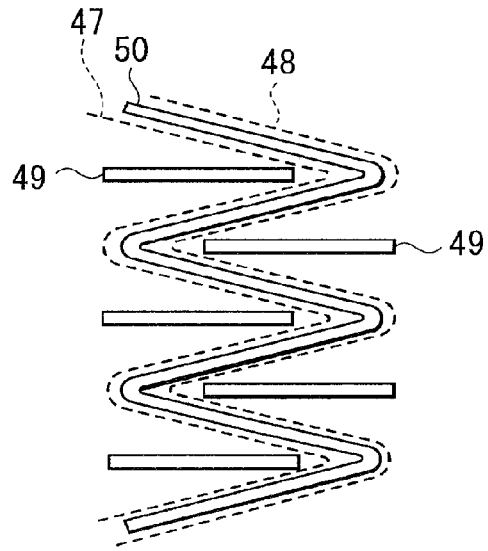

It should be noted that the bending body 43a is formed by repeating bent curved portions within the long and narrow battery can 42 as shown in FIGS. 3A and 3B.

An positive electrode lead wire made of aluminum (Al), for example, and a negative electrode lead wire made of nickel (Ni), for example, are respectively connected to the positive electrode 49 and the negative electrode 50 of the bending body 43a although not shown. More specifically, respective positive electrode lead wire and negative electrode lead wire are connected to several portions of the positive electrode 49 and the negative electrode 50 as a stack type structure.

Here, the positive electrode 49 includes a positive electrode current collector 51 with a first principal plane 51a used as the inner surface of the winding structure and a second principal plane 51b used as the outer surface and in which an inner surface positive electrode active material layer 52 is formed on the side of the first principal plane 51a and an outer surface positive electrode active material layer 53 is formed on the side of the second principal plane 51b, respectively.

Both of the inner surface positive electrode active material layer 52 and the outer surface positive electrode active material layer 53 need not always be provided and it is preferable that they should be selectively provided in response to a desired battery arrangement and desired characteristics. The positive electrode current collector 51 is made of a suitable material such as aluminum (Al), nickel (Ni) or stainless steel.

The inner surface positive electrode active material layer 52 and the outer surface positive electrode active material layer 53 may contain a positive electrode active material and they may contain a conductive assisting agent such as a carbonaceous material and a binder such as poly(vinylidene fluoride) if necessary A lithium containing metal composite oxide, expressed by a general formula $Li_xMO_2$, might be preferable as a positive electrode material because the lithium containing metal composite oxide can generate a high voltage and it is high in density so that a secondary battery can become higher in capacity. It should be noted that M is more than one kind of transition metal and it may be at least one kind selected from a group consisting of cobalt (Co), nickel (Ni) and manganese (Mn). The subscript x may differ depending on the charging and discharging state of the battery and it may be selected so as to satisfy a condition indicated by $0.5 \leq x \leq 1.10$. $LiCoO_2$ or $LiNiO_2$ might be enumerated as specific examples of such lithium containing metal composite oxide. It should be noted that the positive electrode active material may contain any one of the lithium containing metal composite oxides or may contain a mixture of more than two kinds of the lithium containing metal composite oxides.

On the other hand, the negative electrode 50 includes the negative electrode current collector 54 having a first principal plane 54a used as an inner surface in the winding structure and a second principal plane 54b used as an outer surface in which an inner surface positive electrode active material layer 55 is formed on the side of the first principal plane 54 and an outer surface positive electrode active material layer 56 is formed on the side of the second principal plane 54b, respectively.

It should be noted that, as will be described later on, both of the inner and outer surface negative electrode active material layers 55 and 56 need not always be provided. Their thicknesses and materials should preferably be selected in response to roughness of the surface of the negative electrode current collector 54 which will be described later on.

It should be noted that the negative electrode current collector 54 and the negative electrode 50 are used as the third embodiment of the current collector and the negative electrode according to an embodiment of the present invention.

The negative electrode current collector 54 should be preferably made of copper (Cu), stainless steel, nickel (Ni), titanium (Ti), tungsten (W), molybdenum (Mo) or aluminum (Al). Of these metal elements, the negative electrode current collector 54 should preferably be made of metals which can easily be alloyed with the inner surface and outer surface negative electrode active material layers 55 and 56. For example, when the inner and outer surface negative electrode active material layers 55 and 56 contain at least one kind selected from a group consisting of individual elements or compounds of silicon (Si) and tin (Sn) as will be described later on, copper (Cu), titanium (Ti), aluminum (Al) or nickel (Ni) may be enumerated as materials that can be alloyed easily. It should be noted that the negative electrode current collector 54 may be composed of either a single layer or a plurality of layers. In that case, layers that contact with the inner and outer surface negative electrode active material layers 55 and 56 may be made of metal materials that can be alloyed with the inner surface and outer surface negative electrode active material layers 55 and 56 and other layers may be made of other metal materials.

In the battery 41 according to an embodiment of the present invention, if roughness (Ra value) of the first and second principal planes 54a and 54b of the negative electrode current collector 54 forming the negative electrode 50 are mutually different, a battery, though having the current collector 34 at least part of which includes rough surface, may include the negative electrode 50 that are not susceptible to crack or fracture, even when forming a thicker active material layer.

Here, the Ra value represents parameters of surface roughness according to the JIS (Japanese Industrial Standard) standard and implies an arithmetic mean surface roughness.

If the negative electrode current collector 54 differentiates in the surface roughness between the first and second principal planes 54a and 54b, occurrence of crack or fracture on the electrode may be controlled when the negative electrode active material layer is formed on both surfaces of the inner surface and outer surface negative electrode active material layers 55 and 56, or when the negative electrode active material layer is formed only on one surface. However, when the negative electrode active material layer is formed only on one surface, a higher-performance battery may particularly be obtained. It should be noted that if the active material layer is formed only on one principal plane of the negative electrode current collector 54, and only the surface where the active material layer is formed includes rough surface, excellent characteristics may be obtained; and when the active material layer is formed on both principal planes, and both of the principal planes include rough surfaces having different degrees of roughness, excellent characteristics may particularly be obtained.

In the surface roughness of the current collector, the roughness Ra of the principal plane having higher roughness may preferably be equal to or greater than 0.2 μm. Accordingly, adhesion may be increased. However, when an extreme roughing treatment is applied, if roughness of both surfaces of the negative electrode current collector 54 is decreased to include mutually different degrees of roughness, the negative electrode current collector 54 is susceptible to crack or fracture. Therefore, the value Ra of the principal plane having higher roughness may preferably be equal to or less than 3.0 μm.

It should be noted that the optimum value of the roughness Ra and the range thereof are affected by the thickness of the current collector. For example, if a current collector having a thickness of about 5 to 20 μm available at present is unused but instead a thicker current collector is used, drastic roughness may be suppressed to result in less crack or fracture.

Therefore, it is preferable that the optimum value of the roughness Ra and the range thereof be carefully selected based on the relationship. However, a battery having an extremely thick current collector may not increase capacity of the battery due to an increase in the volume of the current collector portion. Therefore, in the battery 41 according to the embodiment of the present invention, as the current collector with which cycle characteristics can be maintained and crack or fracture can be prevented, the current collector having a thickness of about 5 to 30 μm and having the above described range of the Ra value (roughness) may be preferable.

Further, it is preferable that difference in roughness between both surfaces of the first and second principal planes 54a and 54b may be equal to or greater than 0.05 μm base on the Ra value. In contrast, although one principal plane includes a desired value in roughness, if roughness of the other surface may have approximately the same roughness of one principal plane, improvements of characteristics will be limited to certain degrees as will be described later.

Further, as will be described later, the battery according to an embodiment of the present invention can achieve an excellent effect particularly when both of the positive electrode 49 and the negative electrode 50 includes the active material layers that have a thickness greater than 70 μm for the thickness of either one of the current collectors. The electrode having such a thick active material layer may exhibit a decrease in peel strength and may apply large stress to an interface that does not support an entire surface of the current collector.

Accordingly, the electrode becomes susceptible to crack or fracture when charging and discharging the battery. It should be noted that the thickness of the active material layer may be defined as one obtained at full discharge where the remaining battery capacity in the apparatus using the battery reaches zero. That is, this case is different from a case where a battery voltage is set to zero by attaching a fixed resistor to a power supply terminal.

In the battery according to an embodiment of the present invention, if roughness of the first and second principal planes 14*a* and 14*b* of the negative electrode current collector 14 are mutually different, crack or fracture of the electrode, though including a particularly thick active material layer, may be lowered or prevented while maintaining adhesion to the interface.

The internal and external negative electrode active material layers 55 and 66 may contain at least one kind of individual elements or compounds selected from the group consisting of metal elements or semimetal elements which can be alloyed with lithium (Li) as a negative electrode active material due to obtaining high energy density.

Examples of such metal elements or semimetal elements include palladium (Pd), platinum (Pt), zinc (Zn), cadmium (Cd), mercury (Hg), aluminum (Al), indium (In), silicon (Si), germanium (Ge), tin (Sn), lead (Pb), arsenic (As), antimony (Sb) or bismuth (Bi). As examples of these compounds, compounds shown by the chemical formula Mas, Mbt may be given. In the chemical formula, Ma represents at least one kind of metal elements and semimetal elements which can be alloyed with lithium (Li) and Mb represents at least one kind of elements other than Ma. The value s indicates s>0 and the value t indicates t≥0, respectively.

Of these metal elements and semimetal elements, individual elements such as silicon (Si), germanium (Ge), tin (Sn) or lead (Pb), or compounds including the individual elements may be preferable, with individual elements of the silicon (Si) or tin (Sn), or compounds formed of the individual elements of the silicon (Si) or tin (Sn). Thus, the individual element and the compound of silicon (Si) or tin (Sn) have large ability to insert and extract lithium (Li), and may increase energy density of the negative electrode 10 depending on a combination thereof. It should be noted that the compound of silicon (Si) and tin (Sn) may be crystal or amorphous; however, amorphous or an aggregate of microcrystallite may be preferable. The amorphous or microcrystallite may include a broad pattern that has half the width of a peak in a diffraction pattern obtained by X-ray diffraction analysis using CuKα as characteristic X-rays is 0.5° or more at 2θ and ranges of from 30° to 60° at 2θ.

Examples of the compound of silicon (Si) and tin (Sn), include $SiB_4$, $SiB_6$, $Mg_2Si$, $Mg_2Sn$, $Ni_2Si$, $TiSi_2$, $MoSi_2$, $CoSi_2$, $NiSi2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N2O$, $SiO_v$ (0<v≤2), $SnO_w$ (0<w≤2), $SnSiO_3$, LiSiO or LiSnO.

Some of high capacity active materials that can form the first and second negative electrode active material layer 55 and 56 of the negative electrode 50 may drastically change the volume when the battery is charged and discharged as described earlier. In particular, if the high capacity active material contains silicon (Si) or tin (Sn), when the active material layer is thin, the volume may change drastically to peel off the layer from the interface of the current collector and to apply stress to the entire inside of the battery when the battery is charged and discharged, thereby further causing the electrode to be either cracked or fractured. In the battery according to the embodiment of the present invention, when the individual element or compound of silicon (Si) or tin (Sn) is used as the negative electrode active material to obtain high energy density, since the negative electrode can control crack or fracture, thereby forming a large capacity battery without the above-mentioned issues.

The first and second negative electrode active material layers 55 and 56 may be preferably formed by at least one method selected from the group consisting of a vapor-phase method, a liquid-phase method and a sintering method. Specifically, the battery may be prevented from being destroyed as the internal and external negative electrode active material layers 55 and 56 are expanded and contracted when the battery is charged and discharged and the negative electrode current collector 54 and the first and second negative electrode active material layers 55 and 56 can be integrated to improve electron conductivity in the internal and external negative electrode active material layers 55 and 56. The binder and gaps may be decreased or eliminated so that the negative electrode 50 may be reduced in thickness.

It should be noted that the baking method includes mixing powder containing active material and the binder to mold a layer, and the resultant layer is heat-treated in the non-oxidizing atmosphere to form a denser layer than the layer before the heat treatment.

Also, the inner surface and outer surface negative electrode active material layers 55 and 56 should preferably be alloyed with the negative electrode current collector 54 at least on a part of the interface between them and the negative electrode current collector 54. Specifically, at the interface, constitutive elements of the negative electrode current collector 54 should preferably be diffused into the inner surface and outer surface negative electrode active material layers 55 and 56 or constitutive elements of the inner surface and outer surface negative electrode active material layers 55 and 56 should preferably be diffused into the negative electrode current collector 54 or those constitutive elements should preferably be diffused to each other. Although it is frequently observed that this alloying may take place simultaneously when the inner surface and outer surface negative electrode active material layers 55 and 56 are formed by the vapor-phase method, the liquid-phase method or the sintering method, the alloying may take place due to a further heat treatment. It should be noted that the above-mentioned diffusion of elements may be included in alloying in the application of the present invention.

The first and second negative electrode active material layers 15 and 16 may be preferably formed by at least one method selected from the group consisting of a vapor-phase method, a liquid-phase method and a sintering method. The internal and external negative electrode active material layers 55, 56 may preferably be alloyed with the negative electrode current collector 54 at least on a part of the interface between the internal and external negative electrode active material layers 55, 56 and the negative electrode current collector 54.

Specifically, at the interface, elements of the negative electrode current collector 54 should preferably be diffused into the inner surface and outer surface negative electrode active material layers 55 and 56 or elements of the inner surface and outer surface negative electrode active material layers 55 and 56 should preferably be diffused into the negative electrode current collector 54 or those elements should preferably be diffused to each other. Although it is frequently observed that the alloying may take place simultaneously when the inner surface and outer surface negative electrode active material layers 55 and 56 are formed by the vapor-phase method, the liquid-phase method or the sintering method, the alloying may take place due to a further heat treatment. It should be noted that the above-mentioned diffusion of elements may be included in alloying in the application.

It should be noted that powder of the individual element or compound of silicon (Si) or tin (Sn) can be manufactured by a related-art method used in a powder metallurgy and the like. As the related-art method, there may be enumerated a method in which a raw material is melted by a melting furnace such as an arc remelting furnace and a high-frequency induced heating furnace, cooled and ground, a method of quenching a melted metal of a raw material such as a single roll quenching method, a twin-roll quenching method, a gas atomizing method, a water atomizing method or a centrifugal atomizing method and a method in which a melted metal of a raw material is solidified by a cooling method such as a single roll quenching method and a twin-roll quenching method and ground by a suitable method such as a mechanical alloying method. In particular, it is preferable that the gas atomizing method or the mechanical alloying method should be used. It should be noted that these synthesis and grinding should preferably be carried out in the inert gas atmosphere such as argon (Ar) gas, nitrogen (N) gas or helium (H) gas or in the vacuum atmosphere in order to prevent metals from being oxidized by oxygen (O) in the air.

The separators 47 and 48 may separate the positive electrode 49 and the negative electrode 50 from each other and they may pass lithium (Li) ions while preventing an electric current from being short-circuited when both electrodes 49 and 50 contact with each other, and they may be formed of a micro-porous polyolefin film such as a polyethylene film or a polypropylene film, for example. In order to maintain safety, it is preferable that the separators 47 and 48 may have a function to close the micro-pores by hot-melting at a temperature higher than a predetermined temperature (for example, 120° C.) thereby to increase resistance so that an electric current may be interrupted. More than two separators mainly made of polyethylene and more than two separators with different compositions mainly made of polypropylene can be bonded.

The separators 47 and 48 are impregnated with an electrolytic solution (not shown). This electrolytic solution may contain a solvent and an electrolytic salt dissolved into this solvent, and they may contain various kinds of additives, if necessary.

As the solvents, there may be enumerated propylene carbonate, ethylene carbonate, diethyl carbonate, methyl ethyl carbonate, 1, 2-dimethoxy ethane, 1, 2-diethoxy ethane, γ-butyrolactone, tetrahydrofuran, 2-methyl tetrahydrofuran, 1, 3-dioxolane, 4-methyl-1, 3-dioxolane, diethyl ether, sulfolane, methyl sulfolane, acetonitrile, propylnitrile, anisole, acetic ester or propionic acid ester. Any one of the above-mentioned additives may be used as the above solvent or more than two kinds of the above-mentioned additives may be mixed and used as the above solvent.

As the electrolytic salt, there may be enumerated $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$, $LiN(C_4F_9SO_2)(CF_3SO_2)$, LiCl or LiBr. Of these electrolytic salts, $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$ or $LiN(C_4F_9SO_2)(CF_3SO_2)$ should be preferable. Of these electrolytic salts, $LiPF_6$ or $LiBF_4$ should be particularly preferable. Any one of the above electrolytic salts may be used as the above electrolytic salt or more than two kinds of electrolytic salts may be mixed and used as the above electrolytic salt.

EXAMPLES

Results obtained when characteristics of the batteries having the arrangements according to the first and second embodiments of the present invention were measured will hereinafter be described in detail with reference to the drawings as specific examples of the present invention. In the following examples, reference numerals and symbols used in the first to third embodiments of the present invention denote identical elements and parts.

Thicknesses of active material layers in the following examples are results obtained when the thicknesses of the negative electrodes in the completely discharged state were measured in actual practice, and thicknesses obtained from film deposition to press-molding are slightly lowered values. Thicknesses of opposing electrodes were adjusted in such a manner that utilization factor of the negative electrode may reach 90% after the active material layers were formed on the surface of the current collector. Also, in any of the examples, the battery was charged at a constant current density of 5 mA/cm² until a battery voltage reaches 4.2V and at a constant voltage of 4.2V until a current density reaches 0.2 mA/cm². Also, the battery was discharged at a constant current density of 5 mA/cm² until a voltage reaches 2.5V.

It should be noted that discharge capacity retention rate in the following explanation is assumed to be a capacity retention rate after 100 cycles when an initial discharge capacity was set to 100.

Example 1

In this example, the element winding type square battery described in the first embodiment was manufactured and used.

In this example, an element winding type square battery was manufactured as follows.

First, the positive electrode 9 was formed. Specifically, a positive electrode mixture was prepared by mixing 91 wt % of $LiNi_{0.8}Co_{0.19}Al_{0.01}O_2$ having an average secondary particle size of 15 μm, 6 wt % of graphite used as a conductive assisting agent and 3 wt % of polyvinylidene fluoride used as a binder. After that, this positive electrode mixture was dispersed into N-methyl-2-pyrrolidone and thereby formed as positive electrode mixture slurry. Subsequently, this positive electrode mixture slurry was coated on the aluminum positive electrode current collector 11 having a thickness of 20 μm, dried and compression-molded by a roller press machine and thereby the inner surface positive electrode active material layer 12 and the outer surface positive electrode active material layer 13 are formed, resulting in the positive electrode 9 being obtained.

Subsequently, the negative electrode 10 was manufactured. Specifically, first, 12 μm-thick rolled copper foil was prepared, copper particles were deposited on the surface, one surface or both surfaces with roughness of Ra of 0.05 μm by an electrolytic deposition method and thereby copper foil with a predetermined surface roughness was obtained as the negative electrode current collector 14. The electrolytic deposition method in the manufacturing of this negative electrode current collector 14 was carried out by adjusting a time and electrolytic conditions in the deposition of the copper particles in such a manner that the first principal plane 14a used as the inner surface of the winding structure finally and the second principal plane 14b used as the outer surface may have different roughness. With respect to the first principal plane 14a and the second principal plane 14b having predetermined different surface roughness, a mixture of natural graphite with a particle size of 25 μm and PVdF at a mixing ratio of 95:5 (wt %) was dispersed into NMP. After the negative electrode active material layers 15 and 16 was formed by coating the resultant mixture on the negative electrode current collector 14, they were dried and pressed and thereby the negative electrode 10 was obtained. It should be noted that the thickness of the active material layers was obtained when the thickness of the negative electrode in the completely discharged state was measured in actual practice. The thickness obtained immediately after the electrode was manufactured (from film deposition to press-molding) becomes a little smaller value.

It should be noted that, when the cross section of the negative electrode 10 was sliced by a focused ion beam (FIB: Focused Ion Beam) in order to observe the interface between the negative electrode active material layers 15 and 16 and the negative electrode current collector 14 and analyzed by AES (Auger electron spectroscopy), it was confirmed that the negative electrode active material layers 15 and 16 and the negative electrode current collector 14 were alloyed.

After the positive electrode 9 and the negative electrode 10 were manufactured, a positive lead wire with an insulating tape attached thereto was connected to one end of the positive electrode current collector 11 of the positive electrode 9, the positive electrode 9 and the negative electrode 10 were laminated through the 30 μm-thick separators 7 and 8 made of micro-porous polyethylene film, wound and thereby the electrode winding body 3 with a shortest diameter S of 17.37 mm and a longest diameter L of 17.45 mm was manufactured. After the electrode winding body 3 was formed, both end portions perpendicular to the winding surface of the electrode winding body 3 were sandwiched by a pair of insulating plates, the positive electrode lead wire was welded to the safety valve mechanism 6, the negative electrode lead wire (not shown) was welded to the bottom portion of the battery can 2 and the electrode winding body 3 was housed within the battery can 2 made of iron.

Thereafter, an electrolytic solution was injected into the inside of the battery can 2. As the electrolytic solution, there was employed such electrolytic solution in which $LiPF_6$ with a concentration of 1 $mol/dm^3$ was dissolved into a mixture of ethylene carbonate (EC) used as a solvent and diethyl carbonate (DEC) with a weight ratio of EC:DEC=3:7.

After the electrolytic solution was injected into the inside of the battery can 2, the battery lid 5 was caulked to the battery can 2 through the gasket and thereby the battery 1 was obtained as a square secondary battery.

With respect to such battery, batteries corresponding to examples 1-1 to 1-7 and comparative examples 1-1 to 1-8 were manufactured by changing combinations of roughness of the first principal plane 14a used as the inner surface of the winding structure and the second principal plane 14b used as the outer surface of the winding structure, the thickness of the inner surface negative electrode active material layer 15 formed on the first principal plane 14a and the thickness of the outer surface negative electrode active material layer 16 formed on the second principal plane 14b, respectively and discharge capacity retention rates thereof were measured. Measured results are shown on the following TABLE 1.

TABLE 1

|  | First Principal Plane Roughness (μm) | First principal plane active material layer | | Second Principal Plane Roughness (μm) | Second principal Plane active material layer | | Discharge capacity retention rate (%) | Number Of cracks |
|---|---|---|---|---|---|---|---|---|
|  |  | Material | Film Thickness (μm) |  | material | Film Thickness (μm) |  |  |
| Example 1-1 | 0.1 | Graphite | 60 | 0.05 | Graphite | 60 | 90 | 0 |
| Example 1-2 | 0.2 | Graphite | 60 | 0.05 | Graphite | 60 | 92 | 0 |
| Example 1-3 | 0.4 | Graphite | 60 | 0.05 | Graphite | 60 | 93 | 0 |
| Example 1-4 | 0.6 | Graphite | 60 | 0.05 | Graphite | 60 | 92 | 0 |
| Example 1-5 | 0.4 | Graphite | 80 | 0.05 | Graphite | 80 | 90 | 0 |
| Example 1-6 | 0.4 | Graphite | 110 | 0.05 | Graphite | 110 | 84 | 2 |
| Example 1-7 | 0.4 | Graphite | 130 | 0.05 | Graphite | 130 | 82 | 3 |
| Comparative Example 1-1 | 0.05 | Graphite | 60 | 0.05 | Graphite | 60 | 89 | 0 |
| Comparative Example 1-2 | 0.4 | Graphite | 60 | 0.4 | Graphite | 60 | 88 | 3 |
| Comparative Example 1-3 | 0.05 | Graphite | 80 | 0.05 | Graphite | 80 | 82 | 0 |
| Comparative Example 1-4 | 0.4 | Graphite | 80 | 0.4 | Graphite | 80 | 84 | 5 |
| Comparative Example 1-5 | 0.05 | Graphite | 110 | 0.05 | Graphite | 110 | 77 | 2 |
| Comparative Example 1-6 | 0.4 | Graphite | 110 | 0.4 | Graphite | 110 | 48 | 9 |
| Comparative Example 1-7 | 0.05 | Graphite | 130 | 0.05 | Graphite | 130 | 52 | 4 |
| Comparative Example 1-8 | 0.4 | Graphite | 130 | 0.4 | Graphite | 130 | 33 | 12 |

From the results in the TABLE 1, it could be confirmed that, when the thicknesses of the active material layers 15 and 16 formed on the first and second principal planes 14a and 14b are equal to each other, the batteries having the arrangements according to an embodiment of the present invention in which roughness of the first and second principal planes 14a and 14b is different according to the examples 1-1 to 1-7 could exhibit higher discharge retention ratios.

Also, the batteries having the arrangements according to an embodiment of the present invention in the examples 1-1 to 1-7 had lesser cracks and cracks are not produced in, particularly, the batteries of the examples 1-1 to 1-5. Further, it could be confirmed that the battery of the example 1-7 had far excellent characteristics of both cracks and discharge capacity retention rates as compared with batteries of the corresponding comparative examples 1-7 and 1-8.

Example 2

In this example, the element winding type square battery explained in the first example was manufactured and used.

It should be noted that, when the battery was manufactured, an active material layer similar to that of the first example was formed so as to have a thickness of about 110 µm.

In such battery, with respect to combinations of roughness of the first principal plane 14a used as the inner surface of the winding structure and the second principal plane 14b used as the winding structure of the negative electrode current collector 14 constructing the negative electrode 10, principal planes with higher roughness were made different and batteries corresponding to example 2-1 and comparative examples 2-1 to 2-3 were manufactured. Then, discharge capacity retention rates thereof were measured. Measured results are shown on the following TABLE 2].

con particles with an average particle size of 3 µm and polyamide acid were mixed in the NMP and thereby formed as slurry and this slurry was coated on a current collector. Next, after the electrode was dried and press-molded, a resultant molded product was heat-treated at 400° C. for three hours in the atmosphere of argon (Ar) gas. In that case, a mixing ratio of polyamide acid relative to the silicon particles was adjusted so as to reach 10% in weight ratio.

With respect to such battery, while combinations of roughness of the first principal plane 14a used as the inner surface of the winding structure and the second principal plane 14b used as the outer surface of the winding structure of the negative electrode current collector 14 constructing the negative electrode 10, compositions a composition of the inner surface negative electrode active material layer 15 formed on the first principal plane 14a and a composition of the outer surface negative electrode active material layer 16 formed on the second principal plane 16 were respectively being changed, batteries corresponding to examples 3-1 to 3-4 and comparative examples 3-1 to 3-8 were manufactured and discharge capacity retention rates thereof were measured. Measured results are shown on the following TABLE 3]. The TABLE 3 is formed of TABLES 3A and 3B so as to permit a use of a suitably large-scale.

TABLE 2

| | First principal plane roughness (µm) | First principal plane active material layer | | Second principal plane roughness (µm) | Second principal plane active material layer | | Discharge capacity retention rate (%) | Number of cracks |
|---|---|---|---|---|---|---|---|---|
| | | material | Film thickness (µm) | | material | Film thickness (µm) | | |
| Example 2-1 | 0.4 | Graphite | 110 | 0.05 | — | — | 90 | 2 |
| Comparative example 2-1 | 0.05 | Graphite | 110 | 0.05 | — | — | 81 | 2 |
| Comparative example 2-2 | 0.05 | Graphite | 110 | 0.4 | — | — | 72 | 6 |
| Comparative example 2-3 | 0.4 | Graphite | 110 | 0.4 | — | — | 69 | 8 |

From the results shown in the TABLE 2, it could be confirmed that, when roughness of the first and second principal planes 14a and 14b were made different, if roughness of the first principal plane 14a was made higher than that of the second principal plane 14b, particularly high discharge capacity retention rates were exhibited.

Also, with respect to the number of cracks, it could be confirmed from the result of the example 2-1 having the arrangement according to an embodiment of the present invention that the example 2-1 can suppress the number of cracks to the number of cracks equal to or less than those of the comparative examples 2-1 to 2-3.

Example 3

In this example, the element winding type square battery described in the first embodiment was manufactured and used.

It should be noted that, when the battery according to this example was manufactured, first, the natural graphite, sili-

TABLE 3A

| | First principal plane Roughness (µm) | First principal plane Active material layer | | Second principal Plane Roughness (µm) |
|---|---|---|---|---|
| | | Material | Film thickness (µm) | |
| Example 3-1 | 0.4 | Graphite | 110 | 0.05 |
| Example 3-2 | 0.4 | Graphite:Si = 8:2 | 110 | 0.05 |
| Example 3-3 | 0.4 | Graphite:Si = 6:4 | 110 | 0.05 |
| Example 3-4 | 0.4 | Graphite:Si = 3:7 | 110 | 0.05 |
| Comparative Example 3-1 | 0.05 | Graphite | 110 | 0.05 |
| Comparative Example 3-2 | 0.4 | Graphite | 110 | 0.4 |
| Comparative Example 3-3 | 0.05 | Graphite:Si = 8:2 | 110 | 0.05 |
| Comparative Example 3-4 | 0.4 | Graphite:Si = 8:2 | 110 | 0.4 |
| Comparative Example 3-5 | 0.05 | Graphite:Si = 6:4 | 110 | 0.05 |
| Comparative Example 3-6 | 0.4 | Graphite:Si = 6:4 | 110 | 0.4 |
| Comparative Example 3-7 | 0.05 | Graphite:Si = 3:7 | 110 | 0.05 |

TABLE 3A-continued

| | First principal plane Roughness (μm) | First principal plane Active material layer Material | First principal plane Active material layer Film thickness (μm) | Second principal Plane Roughness (μm) |
|---|---|---|---|---|
| Comparative Example 3-8 | 0.4 | Graphite:Si = 3:7 | 110 | 0.4 |

TABLE 3B

| | Second principal plane Active material layer material | Film thickness (μm) | Volume changing rate (%) | Discharge capacity retention rate (%) | Number of cracks |
|---|---|---|---|---|---|
| Example 3-1 | Graphite | 110 | 1 | 81 | 1 |
| Example 3-2 | Graphite:Si = 8:2 | 110 | 10 | 82 | 2 |
| Example 3-3 | Graphite:Si = 6:4 | 110 | 30 | 79 | 3 |
| Example 3-4 | Graphite:Si = 3:7 | 110 | 80 | 72 | 4 |
| Comparative Example 3-1 | Graphite | 110 | 1 | 76 | 2 |
| Comparative Example 3-2 | Graphite | 110 | 1 | 52 | 7 |
| Comparative Example 3-3 | Graphite:Si = 8:2 | 110 | 10 | 69 | 3 |
| Comparative Example 3-4 | Graphite:Si = 8:2 | 110 | 10 | 40 | 11 |
| Comparative Example 3-5 | Graphite:Si = 6:4 | 110 | 30 | 60 | 5 |
| Comparative example 3-6 | Graphite:Si = 6:4 | 110 | 30 | 32 | 15 |
| Comparative example 3-7 | Graphite:Si = 3:7 | 110 | 80 | 42 | 4 |
| Comparative example 3-8 | Graphite:Si = 3:7 | 110 | 80 | 12 | 19 |

From the results shown in the TABLE 3, it could be confirmed that, when the volume change rate of the outer negative electrode active material layers 16 formed on the second principal plane 14b are equal, the batteries in the examples 3-1 to 3-4 in which the first and second principal planes 14a and 14b have different roughness can exhibit higher discharge capacity retention rates.

A difference between the discharge capacity retention rates of the examples and the comparative examples is increased as the content of silicon that can make large-capacity become possible is increased. Also, since the batteries having the arrangement according to an embodiment of the present invention in the examples 3-1 to 3-4 have lesser cracks, excellent characteristics with respect to the arrangement of the present invention could be confirmed in both of the number of cracks and the discharge capacity retention rate.

Example 4

In this example, the element winding type square battery described in the first embodiment was manufactured and used.

It should be noted that, when the battery is manufactured, unlike the first embodiment, tin (Sn) having a thickness of about 4 μm was plated on both surfaces of the first and second principal planes 14a and 14b of the negative electrode current collector 14 on which cobalt having a thickness of about 2 μm was deposited by a vacuum deposition method. Then, a product was heat-treated at 200° C. for six hours in the atmosphere of argon (Ar) gas and thereby the negative electrode 10 was formed.

With respect to such battery, while combinations of roughness of the first principal plane 14a used as the inner surface of the winding structure and the second principal plane 14b used as the outer surface in the winding structure were being changed and the volume change ratio of the outer surface negative electrode active material layer 16 formed on the second principal plane 14b was being made constant, batteries corresponding to the examples 4-1 to 4-4 and the comparative examples 4-1 and 4-2 were manufactured and discharge capacity retention rates thereof were measured. Measured results are shown on the following TABLE 4]. The TABLE 4 is formed of TABLES 4A and 4B so as to permit a use of suitably large-scale.

TABLE 4A

| | First principal Plane Roughness (μm) | First principal plane Active material layer Material | First principal plane Active material layer Film Thickness (μm) | Second principal Plane Active material Layer |
|---|---|---|---|---|
| Example 4-1 | 0.4 | Sn + Co | 4 + 2 | 0.05 |
| Example 4-2 | 0.4 | Sn + Co | 4 + 2 | 0.2 |
| Example 4-3 | 0.6 | Sn + Co | 4 + 2 | 0.2 |
| Example 4-4 | 0.6 | Sn + Co | 4 + 2 | 0.5 |
| Comparative Example 4-1 | 0.05 | Sn + Co | 4 + 2 | 0.05 |
| Comparative Example 4-2 | 0.4 | Sn + Co | 4 + 2 | 0.4 |

TABLE 4B

| | Second principal plane Active material layer material | Film Thickness (μm) | Volume Change rate (%) | Discharge Capacity Retention Rate (%) | Number of Cracks |
|---|---|---|---|---|---|
| Example 4-1 | Sn + Co | 4 + 2 | 60 | 72 | 0 |
| Example 4-2 | Sn + Co | 4 + 2 | 60 | 80 | 1 |
| Example 4-3 | Sn + Co | 4 + 2 | 60 | 78 | 4 |
| Example 4-4 | Sn + Co | 4 + 2 | 60 | 73 | 5 |
| Comparative Example 4-1 | Sn + Co | 4 + 2 | 60 | 49 | 0 |
| Comparative Example 4-2 | Sn + Co | 4 + 2 | 60 | 44 | 11 |

From the results in the TABLE 4, it could be confirmed that, also when the active material layer is made of tin (Sn), the batteries in the examples 4-1 to 4-4 in which the first and second principal planes 14a and 14b are different in roughness according to the arrangement of the present invention can exhibit higher discharge capacity retention rates.

Further, the batteries in the examples 4-1 to 4-4 having the arrangement according to an embodiment of the present invention have fewer cracks and the number of cracks can further be decreased as a difference of roughness between the first and second principal planes 14a and 14b is increased.

Example 5

In this example, the element winding type square battery explained in the first embodiment, the element winding type cylindrical (tubular) battery explained the second embodiment and a stack type square battery were manufactured and used.

In this example, the element winding type square battery was manufactured by a procedure similar to that of the first example.

However, the inner surface negative electrode active material layer 15 and the outer surface negative electrode active material layer 16 of the negative electrode current collector 14 were formed by forming silicon (Si) having a thickness of about 4 μm on the negative electrode current collector 14 by an RF (radio frequency) sputtering method. Thereafter, a resultant product was heat-treated at 280° C. for six hours in the atmosphere of argon (Ar) gas and the resultant product was used as a negative electrode.

Also, in this example, the element winding type cylindrical battery explained in the second embodiment was manufactured and used.

The element winding type cylindrical battery 21 was manufactured by the following procedure.

First, the positive electrode 29 was manufactured. Specifically, a positive electrode mixture was prepared by mixing 91 wt % of $LiNi_{0.8}Co_{0.19}Al_{0.01}O_2$ having an average secondary particle size of 15 μm, 6 wt % of graphite used as a conductive assisting agent and 3 wt % of poly(vinylidene) fluoride used as a binder. After that, this positive electrode mixture was dispersed into N-methyl-2-pyrrolidone and thereby formed as positive electrode mixture slurry.

Subsequently, this positive electrode mixture slurry was coated on the aluminum positive electrode current collector 31 having a thickness of 20 μm, dried and compression-molded by a roller press machine and thereby the inner surface positive electrode active material layer 32 and the outer surface positive electrode active material layer 33 were formed, resulting in the positive electrode 29 being obtained.

Subsequently, the negative electrode 30 was manufactured. Specifically, first, a 12 μm-thick rolled copper foil was prepared, copper particles were deposited on the surface, one surface or both surfaces with roughness of Ra of 0.05 μm by an electrolytic deposition method and thereby copper foil with a predetermined surface roughness was obtained as the negative electrode current collector 34. The electrolytic deposition method in the manufacturing of this negative electrode current collector 34 was carried out by adjusting a time and electrolytic conditions in the deposition of the copper particles in such a manner that the first principal plane 34a used as the inner surface of the winding structure finally and the second principal plane 34b used as the outer surface may have different roughness. Silicon (Si) having a thickness of about 4 μm was deposited on the first principal plane 34a and the second principal plane 34b having predetermined different surface roughness of the thus obtained negative electrode current collector 34 by an RF sputtering method. Thereafter, the resultant product was heat-treated at 280° C. for six hours in the atmosphere of argon (Ar) gas and the finally obtained product was used as the negative electrode.

It should be noted that, when the cross section of the negative electrode 30 was sectioned by a focused ion beam (FIB: Focused Ion Beam) in order to observe the interface between the negative electrode active material layers 35 and 36 and the negative electrode current collector 34 and analyzed by AES (Auger electron spectroscopy), it was confirmed that the negative electrode active material layers 35 and 36 and the negative electrode current collector 34 were alloyed.

After the positive electrode 29 and the negative electrode 30 were manufactured, a positive lead wire with an insulating tape attached thereto was connected to one end of the positive electrode current collector 31 of the positive electrode 29, the positive electrode 29 and the negative electrode 30 were laminated through the 30 μm-thick separators 27 and 28 made of a micro-porous polyethylene film, wound and thereby the electrode winding body 23 having a shortest diameter S of 17.37 mm and a longest diameter L of 17.45 mm was manufactured. After the electrode winding body 23 was formed, both end portions perpendicular to the winding surface of the electrode winding body 23 were sandwiched by a pair of insulating plates, the positive electrode lead wire was welded to the safety valve mechanism 36, the negative electrode lead wire (not shown) was welded to the bottom portion of the battery can 22 and the electrode winding body 23 was housed within the battery can 22 made of iron.

Thereafter, the center pin 24 was inserted into the center of the electrode winding body 23. Subsequently, an electrolytic solution was injected into the inside of the battery can 22. As the electrolytic solution, there was employed such electrolytic solution in which $LiPF_6$ with a concentration of 1 mol/dm$^3$ was dissolved into a mixture of ethylene carbonate (EC) used as a solvent and diethyl carbonate (DEC) with a weight ratio of EC:DEC=3:7.

After the electrolytic solution was injected into the inside of the battery can 22, the battery lid 25 was caulked to the battery can 22 through the gasket and thereby the battery 21 having a diameter of 18 mm and a height of 65 mm was obtained as the cylindrical type secondary battery.

Also, in this example, the element stack type square battery explained in the third embodiment was manufactured.

The element stack type square battery 41 was manufactured by the following procedure.

First, silicon having a thickness of about 4 μm was deposited on the negative electrode current collector 54 having a thickness of 20 μm in which the first and second principal planes 54a and 54b have predetermined Ra values by an RF sputtering method and the resultant product was heat-treated at 280° C. for six hours in the atmosphere of argon (Ar) gas. Then, the finally obtained product was used as the negative electrode. Thereafter, the lead wire 46 was attached to the negative electrode.

On the other hand, cobaltic acid lithium ($LiCoO_2$) used as a positive electrode active material, carbon black used as a conductive material and poly(vinylidene) fluoride were mixed. N-methyl-2-pyrrolidone used as a dispersion medium was mixed to the above mixture, coated and dried on the positive electrode current collector 51 made of aluminum foils and thereby the positive electrode active material layers 52 and 53 were formed on the first and second principal planes 51a and 51b of the positive electrode current collector 51. Thereafter, the lead wire 45 was attached.

Subsequently, the thus manufactured negative electrode 50 and positive electrode 49 were wound through the separators 47 and 48 made of the micro-porous polyethylene film and sandwiched between the exterior members 42 and 44 made of aluminum laminated film. Then, an electrolytic solution was injected into the inside of the exterior members 42 and 44, the exterior members 42 and 44 were hermetically closed and thereby the battery 41 in which the electrode winding body 43 was provided within the hermetically sealed structure was manufactured.

With respect to such battery, while the combinations of roughness of the first principal plane used as the inner surface of the winding structure and the second principal plane used as the outer surface in the winding structure, thicknesses of the inner surface negative electrode active material layer formed on the first principal plane and thicknesses of the outer surface negative electrode active material layer formed on the second principal plane were being respectively changed, batteries corresponding to the examples 5-1 to 5-3 and the comparative examples 5-1 to 5-6 were manufactured and discharge capacity retention rates thereof were measured. Measured results are shown on the following TABLE 5]. The TABLE 5 is formed of TABLES 5A and 5B so as to permit a use of a suitably large-scale.

TABLE 5A

| | First principal Plane Roughness (μm) | First principal plane Active material layer | | Second principal Plane Roughness (μm) |
|---|---|---|---|---|
| | | Material | Film Thickness (μm) | |
| Example 5-1 | 0.5 | Si | 4 | 0.2 |
| Example 5-2 | 0.5 | Si | 4 | 0.2 |
| Example 5-3 | 0.5 | Si | 4 | 0.2 |
| Comparative example 5-1 | 0.2 | Si | 4 | 0.2 |
| Comparative Example 5-2 | 0.5 | Si | 4 | 0.5 |
| Comparative Example 5-3 | 0.2 | Si | 4 | 0.2 |
| Comparative example 5-4 | 0.5 | Si | 4 | 0.5 |
| Comparative Example 5-5 | 0.2 | Si | 4 | 0.2 |
| Comparative Example 5-6 | 0.5 | Si | 4 | 0.5 |

TABLE 5B

| | Second principal plane Active material layer | | | | |
|---|---|---|---|---|---|
| | material | Film Thickness (μm) | Volume Change rate (%) | Discharge Capacity Retention Rate (%) | Number of Crack |
| Example 5-1 | Si | 4 | Stack (square type) | 69 | 0 |
| Example 5-2 | Si | 4 | Winding (square type) | 80 | 2 |
| Example 5-3 | Si | 4 | Winding (square type) | 82 | 2 |
| Comparative Example 5-1 | Si | 4 | Winding (square type) | 62 | 0 |
| Comparative Example 5-2 | Si | 4 | Stack (square type) | 43 | 1 |
| Comparative Example 5-3 | Si | 4 | Stack (square type) | 72 | 1 |
| Comparative Example 5-4 | Si | 4 | Winding (square type) | 73 | 5 |
| Comparative Example 5-5 | Si | 4 | Winding (square type) | 61 | 3 |
| Comparative Example 5-6 | Si | 4 | Winding (square type) | 55 | 11 |

From the results on the TABLE 5, the examples 5-1 to 5-3 in which the first and second principal planes are different in roughness according to the arrangements of the present invention in any types of the batteries can exhibit higher discharge capacity retention rates and the number of cracks can be decreased. Therefore, it could be confirmed that far excellent characteristics can be obtained in both of the number of cracks and the discharge capacity retention rate.

As described in the above-mentioned embodiments and examples, according to the battery of the present invention, since roughness of one side of the current collector is increased, roughness of one side is decreased relatively and the surface roughness values of the front and back surfaces are changed, it is possible to avoid the electrode from being either split or cracked when the battery is charged and discharged. As a result, it becomes possible to maintain high cycle characteristics even in the large-capacity battery.

More specifically, according to an embodiment of the present invention, it is possible to obtain a battery in which the negative electrode is formed of the active material layer of which volume is changed considerably and which includes such negative electrode while the electrode can be suppressed from being either cracked or split. On the other hand, there is a battery with a specification which is easy to crack or split depending on the thickness of the current collector and other arrangement of the battery. In that case, it is also possible to obtain an optimum battery arrangement by using suitable arrangements such as to keep roughness of one side at high level, to keep roughness of the other side at low level, to locate the thick active material layer at the surface with high roughness and to locate the thin active material layer at the surface with low roughness. It should be noted that, as mentioned before, particularly large improvements of characteristics could be confirmed in the winding type element arrangement battery to which local stress of electrode can be easily applied.

It should be noted that the materials available in the above-described embodiments and numerical value conditions such as their quantities, their treatment times and their dimensions are merely those of the suitable examples and also dimensions, shapes and placement relationships in the respective sheets of drawings are described schematically. That is, the present invention is not limited to those embodiments.

For example, the present invention can be applied to various battery arrangements and the containers thereof such as the exterior member and the battery can are not limited to the ones. Therefore, the present invention can be modified and changed variously.

It should be understood by those skilled in the art that various modifications, combinations, sub-combinations and alterations may occur depending on design requirements and other factors insofar as they are within the scope of the appended claims or the equivalents thereof.

What is claimed is:
1. A battery comprising:
a positive electrode, and
a negative electrode,
wherein,
the positive electrode and the negative electrode are spirally wound to form a wound body,
the negative electrode comprises (1) an active material layer having an active material including at least Si or Sn, and (2) a negative electrode current collector having (a) a first principal plane facing outward and corresponding to an outer face of the wound body and (b) a second principal plane facing inward and corresponding to an inner face of the wound body,
the first principal plane has a first surface roughness in a range of 0.2 μm to 3.0 μm, both inclusive,
the negative electrode current collector has a thickness in a range of 5 μm to 30 μm, both inclusive,
a difference between the first surface roughness of the first principal plane of the negative electrode current collector and a second surface roughness of the second principal plane of the negative electrode current collector is greater than 0.05 μm, and each of the first surface roughness and the second surface roughness is an arithmetic mean surface roughness $R_a$.

2. A battery according to claim 1, wherein the first surface roughness of the first principal plane of the negative electrode current collector is higher than the second surface roughness of the second principal plane of the negative electrode current collector.

3. A battery according to claim 1, wherein at least one of the active material layer on the first principal plane of the negative electrode current collector or the active material layer on the second principal plane of the negative electrode current collector has a thickness of 70 μm or more at full discharge.

4. A battery according to claim 1, wherein the active material layer of the negative electrode comprises a graphite material.

5. A battery according to claim 1, wherein the positive electrode comprises a lithium transition metal composite oxide including a metal element selected from the group consisting of cobalt, nickel, and manganese.

6. A battery according to claim 1, wherein the active material layer of the negative electrode has a peak in a diffraction pattern obtained by X-ray diffraction analysis using CuKα of 30° to 60°, and half the width of the peak is 0.5° or more at 2θ.

7. A battery according to claim 1, wherein the active material has particles with diameters in the range of 0.1 μm to 25 μm, both inclusive.

8. A battery according to claim 1 further comprises an electrolyte comprising one or more of propylene carbonate, ethylene carbonate, diethyl carbonate, methyl ethyl carbonate, 1,2-dimethoxy ethane, 1,2-diethoxy ethane, .gamma.-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, propylnitrile, anisole, acetic ester, or propionic acid ester.

9. A battery according to claim 1 further comprises an electrolyte salt, wherein the electrolyte salt comprises at least one of $LiPF_6$ or $LiBF_4$.

10. An electronic apparatus comprising the battery according to claim 1.

11. A negative electrode spirally wound to form a wound body and comprising:
    an active material layer having an active material with at least Si or Sn, and
    a negative electrode current collector having (a) a first principal plane facing outward and corresponding to an outer face of the wound body and (b) a second principal plane facing inward and corresponding to an inner face of the wound body,
wherein,
    the first principal plane has a first surface roughness in a range of 0.2 μm to 3.0 μm, both inclusive,
    the negative electrode current collector has a thickness in a range of 5 μm to 30 μm, both inclusive,
    a difference between a first surface roughness of the first principal plane of the negative current collector and a second surface roughness of the second principal plane of the negative electrode current collector is greater than 0.05 μm, and
    each of the first surface roughness and the second surface roughness is an arithmetic mean surface roughness $R_a$.

* * * * *